United States Patent
Andersen et al.

(10) Patent No.: US 12,243,028 B2
(45) Date of Patent: Mar. 4, 2025

(54) PAYOUT PAYMENT PLATFORM

(71) Applicant: BLOCK, INC., Oakland, CA (US)

(72) Inventors: Robert Andersen, Brooklyn, NY (US);
Brian Grassadonia, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/046,626

(22) Filed: Oct. 14, 2022

(65) Prior Publication Data

US 2023/0065170 A1 Mar. 2, 2023

Related U.S. Application Data

(63) Continuation of application No. 16/933,771, filed on Jul. 20, 2020, now Pat. No. 11,507,931, which is a
(Continued)

(51) Int. Cl.
| | |
|---|---|
| G06Q 20/10 | (2012.01) |
| G06Q 20/34 | (2012.01) |
| G06Q 20/40 | (2012.01) |

(52) U.S. Cl.
CPC ............. G06Q 20/10 (2013.01); G06Q 20/34 (2013.01); G06Q 20/40 (2013.01)

(58) Field of Classification Search
CPC ......... G06Q 20/10; G06Q 20/34; G06Q 20/40
(Continued)

(56) References Cited

U.S. PATENT DOCUMENTS

| | | |
|---|---|---|
| 5,220,501 A | 6/1993 | Lawlor et al. |
| 5,283,829 A | 2/1994 | Anderson |

(Continued)

FOREIGN PATENT DOCUMENTS

| | | |
|---|---|---|
| CA | 3035968 C | 6/2022 |
| EP | 0 913 789 A2 | 5/1999 |

(Continued)

OTHER PUBLICATIONS

Dirks, B., "Send and Request Cash with Siri Using the Updated Square Cash App," AppAdvice, dated Sep. 13, 2016, Retrieved from the Internet URL: https://appadvice.com/post/send-and-request-cash-with-siri-using-the-updated-square-cash-app/721594, on Jul. 23, 2018, pp. 1-3.

(Continued)

*Primary Examiner* — William E Rankins
(74) *Attorney, Agent, or Firm* — Lee & Hayes, P.C.

(57) ABSTRACT

In one embodiment, a method includes receiving first payment data and a first identifier of a first user, wherein the first payment data is linked to the first identifier and stored in a datastore of the payment service and in association with a first user account of the payment service; receiving, second payment data and a second identifier of a second user, wherein the second payment data is linked to the second identifier and stored in the datastore and in association with a second user account of the payment service; receiving a request for a near-instantaneous transfer of a payment for a transaction between the first user and the second user, the request including the first identifier; and in response to receiving the request, identifying the first user account and the second user account; and causing the near-instantaneous transfer of the payment to a financial account of the first user.

20 Claims, 9 Drawing Sheets

Related U.S. Application Data continuation of application No. 14/448,809, filed on Jul. 31, 2014, now abandoned.

(58) Field of Classification Search
USPC .................................................. 705/35, 44
See application file for complete search history.

(56) References Cited

U.S. PATENT DOCUMENTS

| | | |
|---|---|---|
| 5,715,298 A | 2/1998 | Rogers |
| 5,832,460 A | 11/1998 | Bednar et al. |
| 5,870,724 A | 2/1999 | Lawlor et al. |
| 5,884,288 A | 3/1999 | Chang et al. |
| 5,963,647 A | 10/1999 | Downing et al. |
| 6,032,133 A | 2/2000 | Hilt et al. |
| 6,039,250 A | 2/2000 | Ito et al. |
| 6,865,558 B1 | 3/2005 | Pierce et al. |
| 7,003,493 B2 | 2/2006 | Weichert et al. |
| 7,089,208 B1* | 8/2006 | Levchin ............... G06Q 20/02 705/39 |
| 7,107,243 B1 | 9/2006 | McDonald et al. |
| 7,194,437 B1 | 3/2007 | Britto et al. |
| 7,379,920 B2 | 5/2008 | Leung et al. |
| D599,813 S | 9/2009 | Hirsch |
| D604,740 S | 11/2009 | Matheny et al. |
| 7,644,037 B1 | 1/2010 | Ostrovsky |
| 7,657,477 B1 | 2/2010 | Chaffee |
| 7,873,573 B2 | 1/2011 | Realini |
| 7,930,248 B1 | 4/2011 | Lawson et al. |
| 8,131,643 B2 | 3/2012 | Battaglini et al. |
| 8,249,965 B2 | 8/2012 | Tumminaro |
| 8,510,220 B2 | 8/2013 | Rackley, III et al. |
| 8,572,058 B2 | 10/2013 | Reid et al. |
| 8,630,947 B1 | 1/2014 | Freund |
| 8,630,948 B1 | 1/2014 | Hildebrand |
| 8,682,802 B1 | 3/2014 | Kannanari |
| 8,751,379 B1* | 6/2014 | Bueche, Jr. ......... G06Q 20/3255 705/39 |
| 8,762,272 B1 | 6/2014 | Cozens et al. |
| 8,775,306 B2 | 7/2014 | Nosek et al. |
| D721,722 S | 1/2015 | Lee |
| D729,821 S | 5/2015 | Ryan et al. |
| D740,839 S | 10/2015 | BianRosa et al. |
| D757,055 S | 5/2016 | Ryan et al. |
| D757,056 S | 5/2016 | Ryan et al. |
| 9,330,530 B2 | 5/2016 | Englman |
| D759,723 S | 6/2016 | Butcher et al. |
| D760,736 S | 7/2016 | Capela et al. |
| D764,495 S | 8/2016 | Cartlidge |
| 9,483,763 B2 | 11/2016 | Van Os et al. |
| D776,131 S | 1/2017 | Cartlidge |
| 9,595,031 B1 | 3/2017 | Grassadonia et al. |
| 9,773,232 B1 | 9/2017 | Grassadonia et al. |
| D801,373 S | 10/2017 | Vaglio et al. |
| D807,387 S | 1/2018 | Cho et al. |
| 9,881,296 B1 | 1/2018 | Paulin et al. |
| 9,886,689 B1 | 2/2018 | Weichert et al. |
| D815,663 S | 4/2018 | Dudey et al. |
| 9,934,502 B1 | 4/2018 | Grassadonia et al. |
| D819,062 S | 5/2018 | de la Garza |
| 9,990,613 B1 | 6/2018 | Bhatt et al. |
| 10,026,062 B1 | 7/2018 | Sasmaz et al. |
| 10,152,229 B2 | 12/2018 | Peled et al. |
| D837,227 S | 1/2019 | Paulin et al. |
| D879,822 S | 3/2020 | Dalonzo |
| D880,498 S | 4/2020 | Shahidi et al. |
| D882,582 S | 4/2020 | Mariet et al. |
| D882,583 S | 4/2020 | Dattilo-Green et al. |
| 10,949,829 B2 | 3/2021 | Paulin et al. |
| D934,900 S | 11/2021 | Ranka et al. |
| 11,227,275 B2 | 1/2022 | Van Heerden et al. |
| D947,209 S | 3/2022 | Paulin et al. |
| 11,507,931 B1 | 11/2022 | Andersen et al. |
| 2001/0034682 A1 | 10/2001 | Knight et al. |
| 2002/0023055 A1 | 2/2002 | Antognini et al. |
| 2002/0035488 A1 | 3/2002 | Aquila et al. |
| 2002/0087469 A1 | 7/2002 | Ganesan et al. |
| 2002/0116331 A1 | 8/2002 | Cataline et al. |
| 2002/0128967 A1 | 9/2002 | Meyer et al. |
| 2003/0004867 A1 | 1/2003 | Kight et al. |
| 2003/0024979 A1 | 2/2003 | Hansen et al. |
| 2003/0100320 A1 | 5/2003 | Ranjan |
| 2003/0144894 A1 | 7/2003 | Robertson et al. |
| 2004/0019605 A1 | 1/2004 | Keown et al. |
| 2004/0064407 A1 | 4/2004 | Kight et al. |
| 2004/0111367 A1 | 6/2004 | Gallagher et al. |
| 2004/0148252 A1 | 7/2004 | Fleishman |
| 2004/0255137 A1 | 12/2004 | Ying |
| 2006/0080232 A1 | 4/2006 | Epps |
| 2006/0089907 A1 | 4/2006 | Kohlmaier et al. |
| 2006/0206425 A1 | 9/2006 | Sharma |
| 2006/0224508 A1 | 10/2006 | Fietz |
| 2007/0012758 A1 | 1/2007 | Wilson |
| 2007/0022019 A1 | 1/2007 | Sherwin et al. |
| 2007/0179872 A1 | 8/2007 | Macalka et al. |
| 2007/0233615 A1 | 10/2007 | Tumminaro |
| 2007/0244811 A1 | 10/2007 | Tumminaro |
| 2007/0255653 A1 | 11/2007 | Tumminaro et al. |
| 2008/0015982 A1 | 1/2008 | Sokolic et al. |
| 2008/0097905 A1 | 4/2008 | Neofytides et al. |
| 2008/0249936 A1 | 10/2008 | Miller et al. |
| 2008/0288376 A1 | 11/2008 | Panthaki et al. |
| 2008/0318670 A1 | 12/2008 | Zinder et al. |
| 2009/0089193 A1 | 4/2009 | Paintin |
| 2009/0119159 A1 | 5/2009 | Reardon et al. |
| 2009/0313147 A1 | 12/2009 | Balasubramanian et al. |
| 2010/0023450 A1 | 1/2010 | Scipioni |
| 2010/0042538 A1 | 2/2010 | Dheer et al. |
| 2010/0062796 A1 | 3/2010 | Hayton et al. |
| 2010/0114606 A1 | 5/2010 | Snyder |
| 2010/0138312 A1 | 6/2010 | Britto et al. |
| 2010/0280871 A1 | 11/2010 | Goertz et al. |
| 2011/0004551 A1 | 1/2011 | Armes et al. |
| 2011/0082793 A1 | 4/2011 | Boyd |
| 2011/0106677 A1 | 5/2011 | ElBizri |
| 2011/0208600 A1 | 8/2011 | Aharoni et al. |
| 2011/0213707 A1 | 9/2011 | Jackson et al. |
| 2012/0116967 A1 | 5/2012 | Klein et al. |
| 2012/0136781 A1 | 5/2012 | Fridman et al. |
| 2012/0166334 A1 | 6/2012 | Kimberg et al. |
| 2012/0316992 A1 | 12/2012 | Oborne |
| 2013/0022231 A1 | 1/2013 | Nepomniachtchi et al. |
| 2013/0036000 A1 | 2/2013 | Giordano et al. |
| 2013/0060708 A1 | 3/2013 | Oskolkov et al. |
| 2013/0066771 A1 | 3/2013 | Ciurea et al. |
| 2013/0066942 A1 | 3/2013 | Massey et al. |
| 2013/0066976 A1 | 3/2013 | Massey et al. |
| 2013/0085935 A1 | 4/2013 | Nepomniachtchi et al. |
| 2013/0085936 A1 | 4/2013 | Law et al. |
| 2013/0120595 A1 | 5/2013 | Roach et al. |
| 2013/0198061 A1 | 8/2013 | Dheer et al. |
| 2013/0290036 A1 | 10/2013 | Strange |
| 2013/0297353 A1 | 11/2013 | Strange et al. |
| 2013/0304599 A1 | 11/2013 | Vincent |
| 2013/0332268 A1 | 12/2013 | Foster |
| 2013/0346302 A1 | 12/2013 | Purves et al. |
| 2014/0025564 A1 | 1/2014 | Evans |
| 2014/0032406 A1 | 1/2014 | Roach et al. |
| 2014/0052633 A1 | 2/2014 | Gandhi |
| 2014/0058873 A1 | 2/2014 | Sorensen et al. |
| 2014/0114852 A1 | 4/2014 | Rajagopal et al. |
| 2014/0136405 A1 | 5/2014 | DuCharme et al. |
| 2014/0172701 A1 | 6/2014 | Pandhare |
| 2014/0189608 A1 | 7/2014 | Shuttleworth et al. |
| 2014/0214649 A1 | 7/2014 | DuCharme et al. |
| 2014/0250399 A1 | 9/2014 | Gaherwar et al. |
| 2014/0279444 A1 | 9/2014 | Kassemi et al. |
| 2014/0279553 A1 | 9/2014 | Kassemi et al. |
| 2014/0288981 A1 | 9/2014 | Rajkarnikar et al. |
| 2014/0337235 A1 | 11/2014 | Van Heerden et al. |
| 2014/0365376 A1 | 12/2014 | Kassemi et al. |
| 2015/0026049 A1 | 1/2015 | Theurer et al. |
| 2015/0046320 A1 | 2/2015 | Baldwin |
| 2015/0052055 A1 | 2/2015 | Kassemi et al. |

(56) References Cited

U.S. PATENT DOCUMENTS

| | | |
|---|---|---|
| 2015/0088732 A1 | 3/2015 | DeVan, Jr. et al. |
| 2015/0134508 A1 | 5/2015 | Lucas et al. |
| 2015/0154588 A1 | 6/2015 | Purves et al. |
| 2015/0287001 A1 | 10/2015 | Weiss et al. |
| 2015/0310438 A1 | 10/2015 | Kassemi et al. |
| 2015/0332365 A1 | 11/2015 | Kassemi et al. |
| 2015/0371201 A1 | 12/2015 | Read et al. |
| 2016/0012465 A1 | 1/2016 | Sharp |
| 2016/0117670 A1 | 4/2016 | Davis |
| 2016/0132863 A1 | 5/2016 | Dodin |
| 2016/0171481 A1 | 6/2016 | McElmurry, IV et al. |
| 2016/0253651 A1 | 9/2016 | Park et al. |
| 2016/0328692 A1 | 11/2016 | Camps et al. |
| 2016/0342962 A1 | 11/2016 | Park et al. |
| 2017/0068937 A1 | 3/2017 | Liezenberg et al. |
| 2017/0142170 A1 | 5/2017 | Sylvain |
| 2017/0185989 A1 | 6/2017 | Bozovich, Jr. |
| 2017/0249622 A1 | 8/2017 | Ortiz et al. |
| 2017/0336928 A1 | 11/2017 | Chaudhri et al. |
| 2017/0337542 A1 | 11/2017 | Kim et al. |
| 2018/0075444 A1 | 3/2018 | Paulin et al. |
| 2018/0114211 A1 | 4/2018 | Paulin et al. |
| 2018/0218356 A1 | 8/2018 | Grassadonia et al. |
| 2018/0247296 A1 | 8/2018 | Win et al. |
| 2018/0335928 A1 | 11/2018 | Van Os et al. |
| 2019/0220851 A1 | 7/2019 | Barnes et al. |
| 2019/0385133 A1 | 12/2019 | Grassadonia et al. |
| 2021/0166213 A1 | 6/2021 | Paulin et al. |
| 2023/0062881 A1 | 3/2023 | Paulin et al. |

FOREIGN PATENT DOCUMENTS

| | | |
|---|---|---|
| EP | 4033433 A1 | 7/2022 |
| WO | 2013028910 A2 | 2/2013 |
| WO | 2018/049185 A1 | 3/2018 |

OTHER PUBLICATIONS

Fleishman, G., "Circle, Square, and Venmo: Payment Apps Let You Pay via iMessage," TidBITS, dated Oct. 3, 2016, Retrieved from the Internet URL: https://tidbits.com/2016/10/03/circle-square-and-venmo-payment-apps-let-you-pay-via-imessage/, on Jul. 23, 2018, pp. 1-5.

Lee, C., "Here are some apps to try out third-party Siri support in iOS 10," iDownloadBlog, dated Sep. 14, 2016, Retrieved from the Internet URL: http://www.idownloadblog.com/2016/09/14/apps-that-support-siri-ios-10/, on Jul. 23, 2018, pp. 1-2.

Wikipedia—Comparison of instant messaging protocols—Jul. 15, 2016. https://en.wikipedia.org/w/index.php?title=Comparison_of_instant_messaging_protocols&oldid=729888080 (Year: 2016).

Alderman, J., "Debit card 101: what they are, how they work", 3 pages (Jul. 20, 2016).

Non-Final Office Action mailed Jan. 28, 2015, for U.S. Appl. No. 14/569,491, of Bhatt, A., et al., filed Dec. 12, 2014.

Non-Final Office Action mailed Feb. 6, 2015, for U.S. Appl. No. 14/448,809, of Andersen, R., et al., filed Jul. 31, 2014.

Final Office Action mailed Jun. 26, 2015, for U.S. Appl. No. 14/448,809, of Andersen, R., et al., filed Jul. 31, 2014.

Final Office Action mailed Jul. 10, 2015, for U.S. Appl. No. 14/569,491, of Bhatt, A., et al., filed Dec. 12, 2014.

Advisory Action mailed Oct. 21, 2015, for U.S. Appl. No. 14/448,809, of Andersen, R., et al., filed Jul. 31, 2014.

Non-Final Office Action mailed May 25, 2016, for U.S. Appl. No. 14/448,809, of Andersen, R., et al., filed Jul. 31, 2014.

Final Office Action mailed Oct. 11, 2016, for U.S. Appl. No. 14/448,809, of Andersen, R., et al., filed Jul. 31, 2014.

Non-Final Office Action mailed Feb. 2, 2017, for U.S. Appl. No. 15/282,933, of Paulin, A., et al., filed Sep. 30, 2016.

Non-Final Office Action mailed Mar. 24, 2017, for U.S. Appl. No. 15/282,833, of Paulin, A., et al., filed Sep. 30, 2016.

Final Office Action mailed Jun. 5, 2017, for U.S. Appl. No. 15/282,933, of Paulin, A., et al., filed Sep. 30, 2016.

Non-Final Office Action mailed Jul. 20, 2017, for U.S. Appl. No. 14/448,809, of Andersen, R., et al., filed Jul. 31, 2014.

Non-Final Office Action mailed Jul. 26, 2017, for U.S. Appl. No. 14/569,515, of Bhatt, A., et al., filed Dec. 12, 2014.

Non-Final Office Action mailed Aug. 1, 2017, for U.S. Appl. No. 14/569,491, of Bhatt, A., et al., filed Dec. 12, 2014.

Advisory Action mailed Aug. 15, 2017, for U.S. Appl. No. 15/282,933, of Paulin, A., et al., filed Sep. 30, 2016.

Notice of Allowance mailed Sep. 25, 2017, for U.S. Appl. No. 15/282,933, of Paulin, A., et al., filed Sep. 30, 2016.

Notice of Allowance mailed Sep. 27, 2017, for U.S. Appl. No. 15/282,833, of Paulin, A., et al., filed Sep. 30, 2016.

Final Office Action mailed Dec. 13, 2017, for U.S. Appl. No. 14/569,515, of Bhatt, A., et al., filed Dec. 12, 2014.

Notice of Allowance mailed Feb. 1, 2018, for U.S. Appl. No. 14/569,491, of Bhatt, A., et al., filed Dec. 12, 2014.

Advisory Action mailed Feb. 16, 2018, for U.S. Appl. No. 14/569,515, of Bhatt, A., et al., filed Dec. 12, 2014.

Non-Final Office Action mailed Mar. 8, 2018, for U.S. Appl. No. 14/448,809, of Andersen, R., et al., filed Jul. 31, 2014.

Corrected Notice of Allowance mailed Apr. 19, 2018, for U.S. Appl. No. 14/569,491, of Bhatt, A., et al., filed Dec. 12, 2014.

Final Office Action mailed Jul. 19, 2018, for U.S. Appl. No. 14/448,809, of Andersen, R., et al., filed Jul. 31, 2014.

Notice of Allowance mailed Aug. 7, 2018, for Design U.S. Appl. No. 29/577,351, of Paulin, A., et al., filed Sep. 12, 2016.

Non-Final Office Action mailed Dec. 11, 2018, for U.S. Appl. No. 15/282,922, of Paulin, A., et al., filed Sep. 30, 2016.

Non-Final Office Action mailed Jan. 10, 2019, for U.S. Appl. No. 14/569,515, of Bhatt, A., et al., filed Dec. 12, 2014.

Final Office Action mailed Jun. 26, 2019, for U.S. Appl. No. 14/569,515, of Bhatt, A., et al., filed Dec. 12, 2014.

Final Office Action mailed Jul. 3, 2019, for U.S. Appl. No. 15/282,922, of Paulin, A., et al., filed Sep. 30, 2016.

Advisory Action mailed Oct. 9, 2019, for U.S. Appl. No. 15/282,922, of Paulin, A., et al., filed Sep. 30, 2016.

Non-Final Office Action mailed Jan. 27, 2020, for U.S. Appl. No. 15/979,351, of Bhatt, A., et al., filed May 14, 2018.

Non-Final Office Action mailed Mar. 16, 2020, for U.S. Appl. No. 15/282,922, of Paulin, A., et al., filed Sep. 30, 2016.

Non-Final Office Action mailed Apr. 6, 2020, for U.S. Appl. No. 15/851,423, of Paulin, A., et al., filed Dec. 21, 2017.

Final Office Action mailed Jul. 24, 2020, for U.S. Appl. No. 15/851,423, of Paulin, A., et al., filed Dec. 21, 2017.

Final Office Action mailed Aug. 6, 2020, for U.S. Appl. No. 15/979,351, of Bhatt, A., et al., filed May 14, 2018.

Final Office Action mailed Sep. 3, 2020, for U.S. Appl. No. 15/282,922, of Paulin, A., et al., filed Sep. 30, 2016.

Advisory Action mailed Oct. 6, 2020, for U.S. Appl. No. 15/851,423, of Paulin, A., et al., filed Dec. 21, 2017.

Notice of Allowance mailed Nov. 9, 2020, for U.S. Appl. No. 15/851,423, of Paulin, A., et al., filed Dec. 21, 2017.

Non-Final Office Action mailed Apr. 30, 2021, for U.S. Appl. No. 17/174,277, of Paulin, A., et al., filed Feb. 11, 2021.

Non-Final Office Action mailed Jun. 15, 2021, for U.S. Appl. No. 15/979,351, of Bhatt, A., et al., filed May 14, 2018.

Final Office Action mailed Aug. 20, 2021, for U.S. Appl. No. 17/174,277, of Paulin, A., et al., filed Feb. 11, 2021.

Final Office Action mailed Sep. 27, 2021, for U.S. Appl. No. 15/979,351, of Bhatt, A., et al., filed May 14, 2018.

Non-Final Office Action mailed Oct. 8, 2021, for U.S. Appl. No. 16/933,771, of Andersen, R., et al., filed Jul. 20, 2020.

Notice of Allowance mailed Nov. 22, 2021, for Design U.S. Appl. No. 29/668,784, of Paulin, A., et al., filed Nov. 1, 2018.

Advisory Action mailed Nov. 12, 2021, for U.S. Appl. No. 17/174,277, of Paulin, A., et al., filed Feb. 11, 2021.

Notice of Allowance mailed Dec. 8, 2021, for Design U.S. Appl. No. 29/668,784, of Paulin, A., et al., filed Nov. 1, 2018.

Non Final Office Action mailed Jan. 7, 2022, for U.S. Appl. No. 17/174,277, of Paulin, A., et al., filed Feb. 11, 2021.

(56) References Cited

OTHER PUBLICATIONS

Oyova LLC. "What Is an API (Application Programming Interface) and Why You Should Care" Jul. 29, 2014. (Year: 2014).
Roos, Dave. "How to Leverage an API for Conferencing." Oct. 20, 2014. (https://web.archive.org/web/20141020185109/https:money.howstuffworks.com/business-communications/how. (Year: 2014).
Wall, Quinton. "AP Is are Bridging the Mobile App Gap" Mar. 4, 2014 (Year: 2014).
Office Action for EP Application No. 17768936.1 mailed on Aug. 26, 2020.
Summons to attend Oral Proceedings for EP Application No. 17768936.1 mailed on Jun. 29, 2021.
Examination Report No. 1 for AU Application No. 2017322412 mailed Jan. 31, 2020.
Reissued Examination Report No. 1 for AU Application No. 2017322412 mailed Feb. 13, 2020.
Examination Report No. 2 for AU Application No. 2017322412 mailed Oct. 16, 2020.
Examination Report No. 3 for AU Application No. 2017322412 mailed Jan. 20, 2021.
International Search Report and Written Opinion for International Application No. PCT/US2017/050719, mailed Nov. 28, 2017.
Examiner Requisition for CA Application No. 3035968 mailed Apr. 20, 2021.
Examination Report No. 1 for AU Application No. 2021200597 mailed Sep. 13, 2021.
Examination Report No. 2 for AU Application No. 2021200597 mailed Feb. 9, 2022.
Notice of Allowance for CA Application No. 3035968 mailed Jan. 17, 2022.
Non-Final Office Action mailed Jan. 27, 2022, for U.S. Appl. No. 15/979,351, of Bhatt, A., et al., filed May 14, 2018.
Final Office Action mailed Feb. 8, 2022, for U.S. Appl. No. 16/933,771, of Andersen, R., et al., filed Jul. 20, 2020.
Final Office Action mailed Apr. 26, 2022 for U.S. Appl. No. 17/174,277, of Paulin, A., et al., filed Feb. 11, 2021.
Notice of Allowance mailed Apr. 26, 2022, for U.S. Appl. No. 16/933,771, of Andersen, R., et al., filed Jul. 20, 2020.
Examination Report No. 3 for AU Application No. 2021200597 mailed Jun. 1, 2022.
Extended European Search Report for EP Application No. 22155094.0, mailed on Jun. 27, 2022.
Notice of Allowance mailed Jul. 14, 2022, for U.S. Appl. No. 16/933,771, of Andersen, R., et al., filed Jul. 20, 2020.
Notice of Allowance mailed Oct. 6, 2022, for U.S. Appl. No. 17/174,277, of Paulin, A., et al., filed Feb. 11, 2021.
Decision to Refuse for EP Application No. 17768936.1 mailed on Nov. 30, 2021.

\* cited by examiner

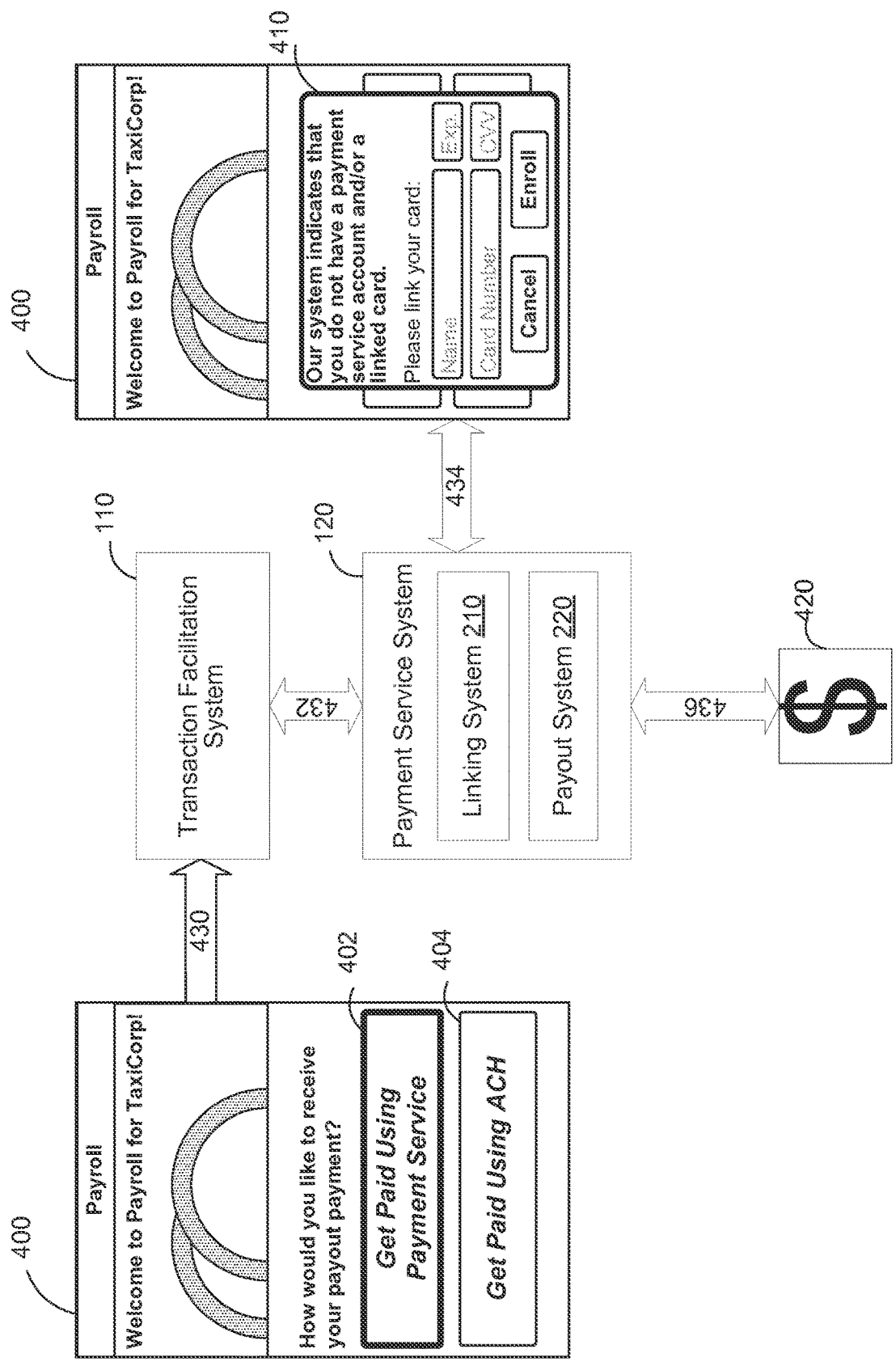

| Member ID1 | Member ID2 | Payment Card Number | Issuer | ... | Billing Address | Link Status |
|---|---|---|---|---|---|---|
| alex@gmail.com | device1234 | XXXX-XXXX-XXXX-XXXX | Bank of America | ... | 123 Sesame St., New York, NY 10086 | Linked |
| bernie@gmail.com | device4321 | XXXX-XXXX-XXXX-XXXX | Wells Fargo | ... | 4321 Easy St., Seattle, WA 98101 | Linked |
| cathy@gmail.com | device1432 | XXXX-XXXX-XXXX-XXXX | Chase | ... | 30 Rock St., New York, NY 10012 | Linked |
| ai@gmail.com | device243 | | | ... | | Unlinked |
| ernie@gmail.com | device4231 | XXXX-XXXX-XXXX-XXXX | VISA | ... | 2000 Grand St., Palo Alto, CA 94022 | Linked |

PAYOUT PAYMENT PLATFORM

CROSS-REFERENCE TO RELATED APPLICATIONS

This application claims priority to and is a continuation under 35 U.S.C. § 120 of U.S. patent application Ser. No. 16/933,771, filed Jul. 20, 2020, which claims priority to and is a continuation under 35 U.S.C. § 120 of U.S. patent application Ser. No. 14/448,809, filed 31 Jul. 2014, entitled "PAYOUT PAYMENT PLATFORM," the entirety of which is herein incorporated by reference.

BACKGROUND

Financial transactions are pervasive in everyday life. On one end, there are transactions between providers of goods and/or services and consumers. On the other end, there are transactions between the providers and third-party facilitators, who facilitate the transactions between the providers and payers (e.g., purchaser or consumer of goods), and provide payout payments (e.g., payrolls) to the providers in exchange for the tender of services and/or goods. Electronic funds transfers associated with these types of transactions often involve a complex process with many steps and several parties, such that it can take some time before the recipients (e.g., the providers) can receive funds for the transactions.

Consider, for example, a scenario in which a consumer, who does not have cash on hand, charges his/her credit card or debit card to pay a taxi company (i.e., facilitator) for a taxi trip provided by a taxi driver (i.e., the provider). The taxi driver is subject to a long waiting period before she is able to receive funds for her share of the taxi ride payment. First, the driver typically has to wait 2-4 business days for several parties (e.g., acquirer, card payment network, and issuing bank) to facilitate and deposit payment funds for the taxi trip into the bank account of the taxi company. Second, the driver has to wait an additional time period for the taxi company itself to process payroll in order for the driver to receive his/her share of the funds. Moreover, the driver has to go through a payroll setup that often involves many complicated steps (e.g., payment account registration, payment account verification, etc.) before she can receive the funds from the taxi company's payroll system. Such registration processes can become overwhelming in a scenario where the driver works for multiple facilitators, requiring multiple payroll setups. Accordingly, traditional methods for a payout payment flow can be very inefficient and costly.

BRIEF DESCRIPTION OF THE DRAWINGS

One or more embodiments of the disclosed technology are illustrated by way of example and not limitation in the figures of the accompanying drawings, in which like references indicate similar elements.

FIGS. 4A-4C are user interface diagrams illustrating examples relating to a payout payment flow.

FIG. 5 is an example of database table that can be utilized in the payout transfer technology, according to various embodiments.

DETAILED DESCRIPTION

Figure 1:
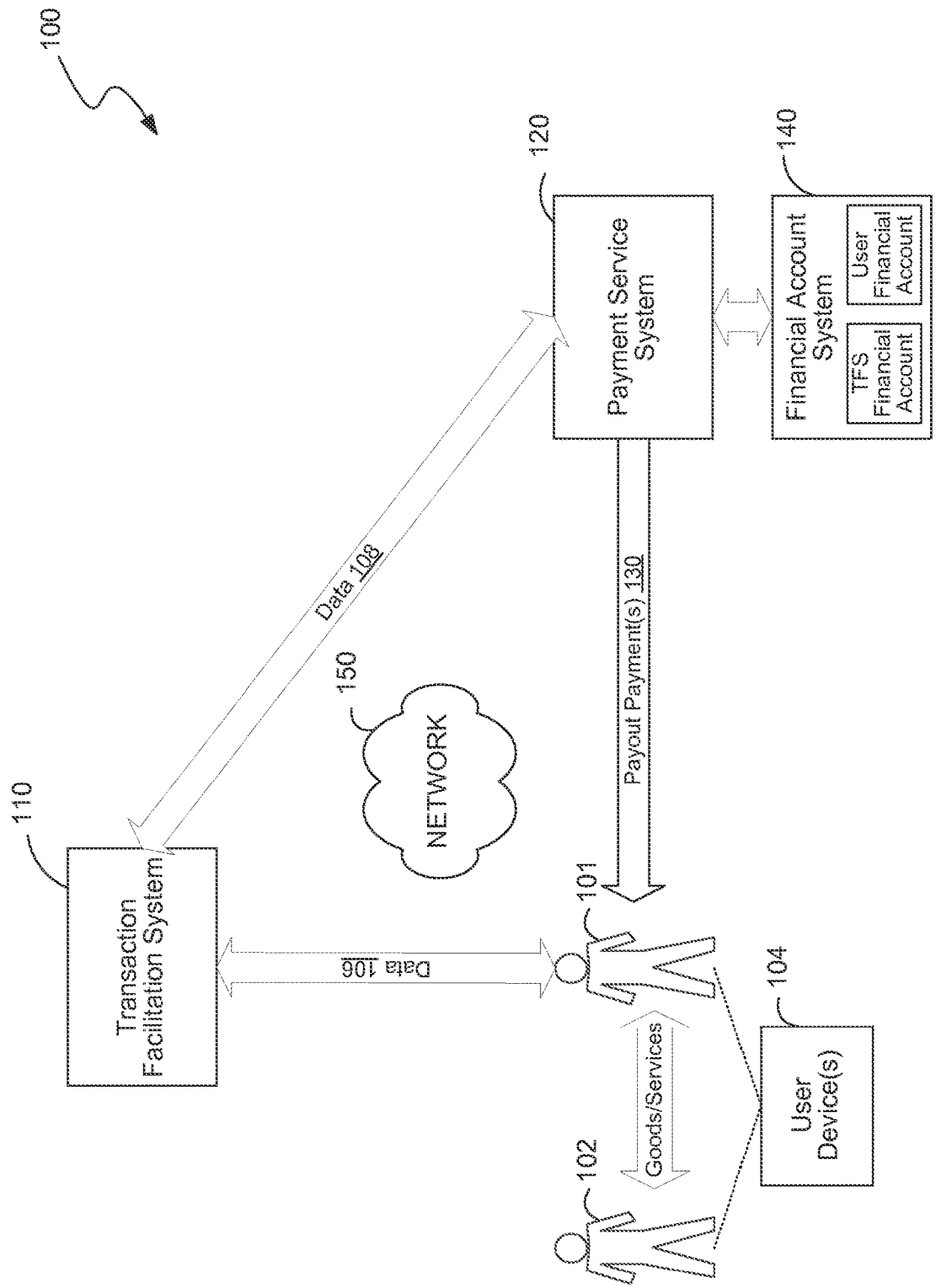
FIG. 1 is a block diagram illustrating a network-based environment in which the payout transfer technology disclosed here can be implemented.

Technology is disclosed for processing payout payment transactions by use of a payment card linking mechanism ("the disclosed technology"). The disclosed technology provides relatively quick and easy processing of a payout payment transaction by linking a financial account of a payee with an identifier of a payee, and generating a payout payment upon identification of the identifier, where the payout payment is directly deposited in the financial account of the payee within a relatively short time. As an example, after a payee has linked an identifier (e.g., an email address) with a financial account, the payee can merely provide that identifier to any payer to be paid quickly without providing any other information. The terms "payout" and "payout payment" generally refer to a disbursement of monetary funds made to a payee. A payout payment is typically made by an intermediary transaction facilitator that facilitates financial transactions between a payer and a payee, where the payee tenders goods and/or services to the payer (e.g., a customer paying for housecleaning service), typically in exchange for a service fee. An example intermediary transaction facilitator includes a maid-service company, a taxi company, an insurance company, a tax service company, a peer-to-peer marketplace, or any business entity that facilitates business on behalf of its employees, agents, contractors, etc.

Briefly described, the disclosed technology enables the payee, who has previously provided either his payment card or identifier, to receive a payout payment in a payee financial account (e.g., bank account) within a short time subsequent to a payout request for that payment (e.g., 10 minutes). The term "payment card" as used herein refers to a payment mechanism that provides electronic access to a monetary balance (e.g., funds) of a financial account. The payment mechanism can be a credit card, a fleet card, a debit card, a pre-paid gift card, a stored-value card, or the like, or any card which functions as a combination of any of these mechanisms. The term "identifier" as used here means an email address, a telephone number, a device identifier, an application identifier, an IP address, a personal identification number (PIN), a card verification value (CVV), a security access code, a driver's license number, a social security number, an employee identification number (ID), a biometric identifier (e.g., fingerprint, face, iris, retina, etc.), or any identification means that function as any combination thereof.

The payout request can be submitted in various scenarios: (a) automatically upon completion of a financial transaction facilitated by the intermediary transaction facilitator; (b) upon an ad hoc basis as requested by the intermediary transaction facilitator; (c) automatically after a period of time; (d) upon request of the payee; etc. Upon submission of the payout request, the payout payment is generated and transferred to the payee financial account. Such transfer is referred to as a "payout transfer" in this description.

Use of the payment card in the disclosed payout transfer technology enables the payout payment to be transferred directly between the financial accounts of (a) a payee (e.g., taxi driver) and an intermediary transaction facilitator (e.g., taxi company) or (b) a payee (e.g., taxi driver) and a payer (e.g., a taxi rider), reducing costly transaction fees (between multiple parties) that are typical in traditional methods, and significantly reducing the waiting time period to receive the funds. Furthermore, the disclosed technology removes the need for complex interchange between multiple parties; so long as the payee's identifier and the payment card information are determined, the funds can be transferred.

In various embodiments, the disclosed technology involves communication between a mobile payment application installed on a mobile device ("mobile device") of a user, a transaction facilitation system ("TFS"), and a payment service system ("PSS"). The mobile payment application enables a payee user to submit (at a first time communicating with the PSS) the payee user's identifier (e.g., email address, instant messaging userid, social networking user account, etc.) and a payment card number, and communicates this data to the TFS, which forwards the data to the PSS for storage and use in future payout transfers.

In some embodiments, the TFS can initiate a payout transfer with the PSS, on behalf of the payee user, by submitting the payee user's identifier to the PSS. For example, the TFS is a house-cleaning company that facilitates the service performed by the payee user for the house of a payer user. In such example, the PSS, upon receiving the TFS's request, can execute the payout transfer to cause an amount to be transferred to the payee user's account.

In some embodiments, the payee user can initiate a payout transfer directly with the PSS by submitting, e.g., using the mobile payment application, the payee user's identifier. The PSS, upon receiving the payee user's request, can execute the payout transfer to cause an amount to be transferred to the payee user's account by using the payment card linked to the identifier of the payee. In some embodiments, the mobile payment application enables a payer user to initiate a payout transfer by submitting, e.g., using a mobile payment application, the payee user's identifier and the payer user's identifier. In such embodiments, the mobile payment application forwards the identifiers to the PSS. The PSS can identify (a) a payer payment card associated with the payer user's identifier, where the payer payment card is indicative of a payer financial account, and (b) a payee payment card associated with the payee user's identifier, where the payee payment card is indicative of a payee financial account. The PSS can identify such information by accessing a database of the PSS, where the database includes one or more payment cards and one or more identifiers (e.g., email addresses). The PSS can then identify a particular payment card that corresponds to the payer user's identifier and another particular payment card that corresponds to the payee user's identifier. Once the PSS has identified such information, the PSS can execute, or trigger execution of, the payout transfer to transfer monetary funds from the payer financial account to the payee financial account.

In various embodiments, the payout transfer can occur substantially instantaneously, for example, after the payee user requests the payout transfer, after the TFS requests from the PSS the payout transfer on behalf of the payee user, or after the payer user makes a payment to the TFS.

In the following description, an example of a consumer paying for a taxi ride is discussed to explain various aspects of the disclosed technology. Note that the example is for illustrative purpose only, and that the disclosed technology is not limited in applicability to a taxi service or to any other particular kind of business. For example, the disclosed technology can be utilized by a cleaning agency facilitating cleaning services rendered by cleaning agents (i.e., payee). Additionally, the disclosed technology can be employed with any transaction that traditionally would be initiated by or involve the use of a payment card or a financial account. Thus, the term "transaction" refers to any exchange of goods and/or services for monetary value. The transaction can be a "card-present" transaction (e.g., in-person shopping) or a "card-not-present" transaction (e.g., Internet shopping).

According to one embodiment of the disclosed technology, to initiate a payout transfer after completion of a payment transaction for a taxi ride, a taxi driver (e.g., payee) first accesses the TFS, using a mobile device, to request for a payout payment. The mobile device can be a device, such as a smartphone or a tablet, that belongs to the taxi driver. The TFS enables the taxi driver to make the payment by communicating with the PSS using a mobile payment application associated with the TFS and executing on the mobile device. The taxi driver, using a user interface of the mobile payment application, enters his email address to request the payout payment for the completed taxi ride. In some instances, the taxi driver can include other information along with the email address, such as transaction details (e.g., total payment amount for the taxi ride, date, time, transaction id, etc.), In response to the taxi driver's submissions, the mobile payment application transmits the payout request to the TFS, which approves the request and forwards it to the PSS. In some embodiments, the mobile payment application automatically forwards the payout request to the PSS. In such embodiments, the payout request can include information identifying the TFS to help the PSS process the payout request on behalf of the TFS. When the PSS receives the payout request, the PSS determines whether the taxi driver is enrolled with the PSS to receive payout payment directly in his account based on the taxi driver's email address. The PSS can determine whether to approve or deny the request based on the enrollment determination. The PSS then communicates the result of the request (e.g., approved or denied) to the mobile payment application. Upon approval of the payout request, the PSS executes or triggers a payout transfer to move funds for the taxi ride to a financial account of the taxi driver. In some embodiments, the PSS transfers the funds from a financial account of the taxi company to the taxi driver's financial account.

In some embodiments, the PSS transfers the funds from a financial account associated with the PSS to the taxi driver's financial account. In such embodiments, the PSS may execute a separate process to redeem the transferred funds from the taxi company, e.g., at the end of every month.

In some embodiments, the PSS transfers the funds from a financial account of the rider to the taxi driver's financial account. In such embodiments, the payout transfer requires the rider and the taxi driver each having an account with the PSS. An account with the PSS can be established upon a user (e.g., rider or taxi driver) linking his/her payment card, such as a debit card, with an identifier, such an email address.

The linking can occur at the initiation of a financial transaction or before the initiation at an earlier time. For example, the rider links her debit card with her email address using the mobile payment application at the same time, or shortly after, she initiates a payment transaction for the taxi ride. In another example, the rider registers with the PSS to create a payment service account before the taxi ride, where the rider links her debit card with her email address. Similarly, the taxi driver can link his debit card with his email address before, during, or shortly after the initiation of the payment transaction. With the accounts configured, the taxi driver can receive funds for his taxi ride service substantially instantaneously (e.g., 10 minutes) upon submitting a payout request.

In some embodiments, the taxi driver pre-establishes an association with the PSS through the TFS to receive the funds for his taxi service(s). In such embodiments, the taxi driver accesses a service platform application executing on a computer system associated with the taxi company to enroll in the service for the payout transfer. The service platform application can be executed, or a part of, the TFS. The service platform application can be a website portal (e.g., portal of a website hosted by the computer system and accessible via an Internet browser application), a conventional software application running on a processing device (e.g., enterprise software installed on a desktop), or the mobile payment application discussed above.

The service platform application can include a payroll portal in which the taxi driver can submit a request to get paid by the method of payout transfer, e.g., get paid by having funds transferred directly into his bank account within a substantially short amount of time subsequent to a request for the payout transfer.

The service platform application running on the computer system forwards the taxi driver's request to get paid to the PSS. The request can include an email address of the taxi driver. The PSS identifies a debit card associated with the taxi driver based on the email address and executes or triggers an enrollment process to enroll the taxi driver for the payout transfer (i.e., direct transfer to bank account for all future taxi service transactions involving the taxi driver's email address). The PSS can identify the debit card of the taxi driver by performing a database lookup, based on an association between the taxi driver's email address and the debit card, which the taxi driver has previously specified to the PSS.

If the taxi driver has not previously specified, or submitted, a payment card (e.g., a debit card), the PSS sends a message to the service platform system. The message is configured to cause the service platform system to output a user interface that prompts the taxi driver to link, e.g., a debit card, to the email address. After the taxi driver has submitted debit card information for linking the debit card via the user interface, the service platform system transmits, to the PSS, a message including the debit card information. The PSS then executes or triggers the enrollment process using the debit card information, such that all future transactions involving the email address will result in funds being transferred to a bank account associated with the debit card.

The taxi driver in this example typically receives a percentage share, not an entire share, of the total transaction amount received from the rider, in accordance with a contractual agreement between the taxi driver and the taxi company facilitating the transaction. Funds for the total transaction amount received from the rider is generally first transferred to a bank account of the taxi company. The PSS then transfers a share of such transaction amount from the taxi company's bank account to the taxi driver's account in accordance with the percentage specified in the agreement. In some instances, the PSS processes the payout transfer on behalf of the intermediary transaction facilitator before the facilitator actually receives the funds for the transaction. For example, a credit card transaction may require some processing time before funds arrive in the intermediary transaction facilitator's bank account.

Although the example provided above uses a mobile device to initiate the process for the payout transfer in the embodiments described above, in other embodiments a processing device other than a mobile device may be used to initiate that process, such as a conventional personal computer (PC). In such embodiments, the mobile payment application can be replaced by a more conventional software application in such processing device, where such software application has functionality similar to that of the mobile payment application as described here.

In some embodiments, the taxi driver can use an identifier other than an email address (e.g., telephone number) to initiate the payout transfer as described above. Additionally, in this description, references to "an embodiment", "one embodiment" or the like, mean that the particular feature, function, structure or characteristic being described is included in at least one embodiment of the disclosed technology. Occurrences of such phrases in this specification do not necessarily all refer to the same embodiment. On the other hand, the embodiments referred to also are not necessarily mutually exclusive.

FIG. 1 illustrates a network-based environment in which the payout transfer disclosed technology can be implemented. The network based environment 100 includes one or more user devices 104, a computer system 110 of a transaction facilitation service (hereinafter "transaction facilitation system (TFS) 110"), and a computer system 120 of a payment service (hereinafter "payment service system (PSS) 120"). The PSS 120 processes payout payments on behalf of the TFS 110. The computer systems 110, 120 can each include one or more distinct physical computers and/or other processing devices which, in the case of multiple devices, can be connected to each other through one or more wired and/or wireless networks. All of the aforementioned devices are coupled to each other through a network 150, which can be or include the Internet and one or more wireless networks (e.g., a WiFi network and/or a cellular telecommunications network).

The TFS 110 is a platform computer system typically utilized by an intermediary transaction facilitator that facilitates various financial transactions between consumers (or customers) and the facilitator's agents, typically in exchange for a service fee. An example TFS 110 is an arts-and-crafts e-commerce platform system that facilitates the buy and sell of handmade or vintage items, art, and supplies in a peer-to-peer marketplace between buyers and sellers. In this example, the arts-and-crafts e-commerce platform system facilitates the transactions on behalf of the sellers in exchange for a fee to use the platform. The intermediary transaction facilitator of the TFS 110 can be a human or a non-human business entity. Other examples of the TFS 110 can include a peer-to-peer marketplace (e.g., arts-and-crafts e-commerce service, peer-to-peer property rental service, peer-to-peer taxi service, peer-to-peer housecleaning service, etc.), an insurance company, a tax service provider, a payroll financial service provider, or any business entity facilitating business on behalf of its service users (e.g., employees, agents, contractors, merchants, etc.). Such service users will be referred to as "payees" in this description.

The PSS 120 assists the TFS 110 in providing payout payments to its payees. As discussed above, a payee receiving the payout payment can be an employee or an individual utilizing the transaction facilitation services provided by the TFS 110. Example payees corresponding to the above example TFS's can include a seller of goods and/or services (e.g., an vintage art seller, an peer-to-peer taxi-service driver, a peer-to-peer rental property host, a peer-to-peer service handyman, etc.), an insurance payout receiver (e.g., an insured individual), a tax refund receiver, a payroll receiver (e.g., company's employees).

The TFS 110 can provide account access to a user 101 to configure various aspects of the services provided by the TFS 110 in accordance with needs of the user 101. The user 101 can be, for example, the payee discussed above. Example services can include a payout service to configure payout payments for various financial transactions, a payroll service to configure payroll, a marketplace payment scheme (e.g., to configure acceptable payment methods from customers), a calendar manager, human resource related services, etc. The user 101 can use a user device 104 to access the services of the TFS 110. The user device 104 can be a mobile device, such as a smartphone, a tablet computer, a notebook computer, or any other form of mobile processing device. In some embodiments, the user device 104 can also be a non-mobile computing device, such as a desktop. One or more applications (not shown), such as a mobile payment application, a service platform application, etc., can run on the user device 104.

The user 101 can carry out various transactions with a user 102 via facilitation provided by the TFS 110, where the user 101 may interact with the user 102 directly or indirectly. In one example, the user 101 is a taxi driver, the user 102 is a passenger, and the TFS 110 is a Taxi Company's computer system, where the users 101 and 102 are interacting directly and the payment transaction is facilitated by the Taxi Company's computer system. In another example, the user 101 is a seller using the TFS 110 of the arts-and-crafts e-commerce platform service to sell hand-made pillowcases to the user 102, where the users 101 and 102 are interacting via the arts-and-crafts marketplace and payment transactions are handled by the TFS 110. In such example, the TFS 110 facilitates one or more payment transactions with the user 102 for purchases of pillowcases, and provides the user 101 with one or more payout payments corresponding to the payment transactions.

The TFS 110 works in coordination with the PSS 120 to provide the payout payment to the user 101, where the payout payment is at least a portion of the transaction payment(s) received from the user 102. In the example above, the TFS 110 provides, for example, a payout payment of $95 to the user 101 for a $100 pillow purchase by the user 102, thereby taking a 5% fee in exchange for the facilitation service. In some embodiments, the TFS 110 provides the payout amount for the payout payment to the PSS 120, e.g., in the payout request to the PSS 120. In some embodiments, the TFS 110 merely provides the total transaction amount. In such embodiments, the TFS 110 can provide a predefined percentage to the PSS 120 for calculating the payout amount. The TFS 110 can provide the predefined percentage either at the same time that it provides the total transaction amount or at an earlier or subsequent time. Using this predefined percentage, the PSS 120 can calculate the appropriate payout amount upon receiving the total transaction amount.

In some embodiments, in order for the payout payment to be provided to the user 101, the user 101 has to have an account with the PSS 120. In some embodiments, the user 101 can create the account with the PSS (hereinafter, "payment service account") separately from the TFS 110. In some embodiments, the user 101 can create the payment service account through the TFS 110, where the user 101 is not required to know about the PSS 120. In such embodiments, the user 101 can create the payment service account by using the user account with the TFS 110. The user 101 can create a user account with the TFS 110 by going through a registration process in which the user 101 submits various information (i.e., data 106), such as a username and a password. The username can be, for example, an email address that identifies the user 101. Either during this account registration process, or at a later point in time after the registration process, the TFS 110 can provide the user 101 with an option to enroll in a direct payout payment process using the PSS 120.

The term "direct payout payment process" as used here refers to a process in which the payout transfer is executed by the PSS 120 to enable the user 101 to receive monetary funds of the payout payment directly in his/her financial account (e.g., a financial account facilitated by financial account system 140). In one example, an arts-and-crafts seller enrolls in the direct payout payment process so that he could receive money in his bank account every time a customer purchases his product via an arts-and-crafts marketplace, where the money is transferred to the bank account substantially instantaneously upon occurrence of the purchase transaction at the marketplace (e.g., customer checks out and submits payment card information). In another example, the arts-and-crafts seller enrolls in the direct payout payment process so that he could receive the money substantially instantaneously upon submitting a payout request to the TFS 110. In another example, an arts-and-crafts seller who has enrolled in the direct payout payment process can receive the money substantially instantaneously upon the TFS 110 submitting a payout request to the PSS 120. The term "substantially instantaneous" as used here refers to the payout transfer occurring
within a substantially short amount of time as compared to traditional methods of transferring monetary funds. In one example, a substantially instantaneous payout transfer can occur within 30 seconds 5 minutes, or 30 minutes of the transaction, as opposed to several days in a traditional credit card transfer. In another example, a substantially instantaneous payout transfer can occur within 24 hours or less than 3 days, as opposed to 3 days in a traditional Automated Clearing House (ACH) transfer. The time period associated with "substantially instantaneous" can be defined by an administrator of the PSS 120 or an administrator of the TFS 110. Further detail regarding the payout transfer will be discussed below in FIGS. 4A-4B.

Upon receiving a request to be enrolled in the direct payout payment process, the TFS 110 would send information identifying the user 101 to the PSS 120 (i.e., data 108). The data 108 can include a portion or more of the data 106 received from the user 101. The data 108 can include an email address or any other identifier associated with the user account created with the TFS 110. The PSS 120 would use the identifier to associate the user 101 with the PSS 120 in enrolling the user 101 in the direct payout payment process. In some embodiments, the PSS 120 generates a payment service account for the user 101 when enrolling the user 101 in the direct payout payment process. In such embodiments, the payment service account is generated using the identifier of the user 101 and the payment card information (including identification of a financial account associated with the payment card). In some embodiments, the PSS 120 stores an association between the payment service account and the identifier, which is linked, or associated, with the payment card of the user 101. In particular, the payment service account is linked to the identifier, such that whenever the PSS 120 receives the identifier, the PSS 120 can identify the payment service account of the user 101. Upon successful enrollment of the user 101, the PSS 120 can generate one or more payout payments 130 for the user 101 on behalf of the TFS 110. In some embodiments, the PSS 120 can transfer funds from a financial account associated with the TFS 110 to a financial account associated with the user 101. In such embodiments, the PSS 120 can communicate with the financial account system 140 to facilitate the transfer of funds. The financial account system 140 can include a network of one or more computer systems facilitating the financial accounts of the TFS 110 and of the user 101, respectively. The financial account system 140 can be, for example, card transaction networks (e.g., Visa, Mastercard®, AMEX®, etc.) and financial institutions (e.g., bank) working in coordination to facilitate various processes of transferring money, including debit rails, credit charge-backs, ACH transfers, etc.

In some embodiments, the enrollment with the PSS 120 that occurs at one particular transaction facilitation system can result in enrollment with the PSS 120 for payout transfer purposes at other transaction facilitation systems. For example, the user 101 may have a job at a cleaning agency and a job at a taxi company, where both the cleaning agency and the taxi company are associated with the PSS 120. That is, both the cleaning agency and the taxi company utilize the PSS 120 to execute payout transfers to their respective agents, contractors, or employees. In such example, the user 101, upon enrolling with the PSS 120 using his cleaning agency user account, will have a payment service account with the PSS 120 generated for future uses with other facilitators that utilize the PSS 120. For instance, the user 101 can request for a payout transfer with the taxi company, without having enrolled in a direct payout payment process with the taxi company before. In such instance, upon receiving a direct payout payment process from the user 101, the taxi company forwards the identifier of the user 101 to the PSS 120. The PSS 120, identifies the payment service account of the user 101 based on the identifier received, and processes the payout request to transfer funds, e.g., from the taxi company's financial account, into the financial account of the user 101. In accordance with the embodiments disclosed here, the user 101 can advantageously reduce the burden of having to go through multiple payout payment registration processes with multiple facilitators (e.g., multiple TFS 110); so long as the user 101 enrolls with one facilitator's payout system, and hence obtains a payment service account that gets automatically generated for the user 101, the user 101 can utilize the direct payout payment process with all other facilitator systems associated with the PSS 120.

Figure 2:
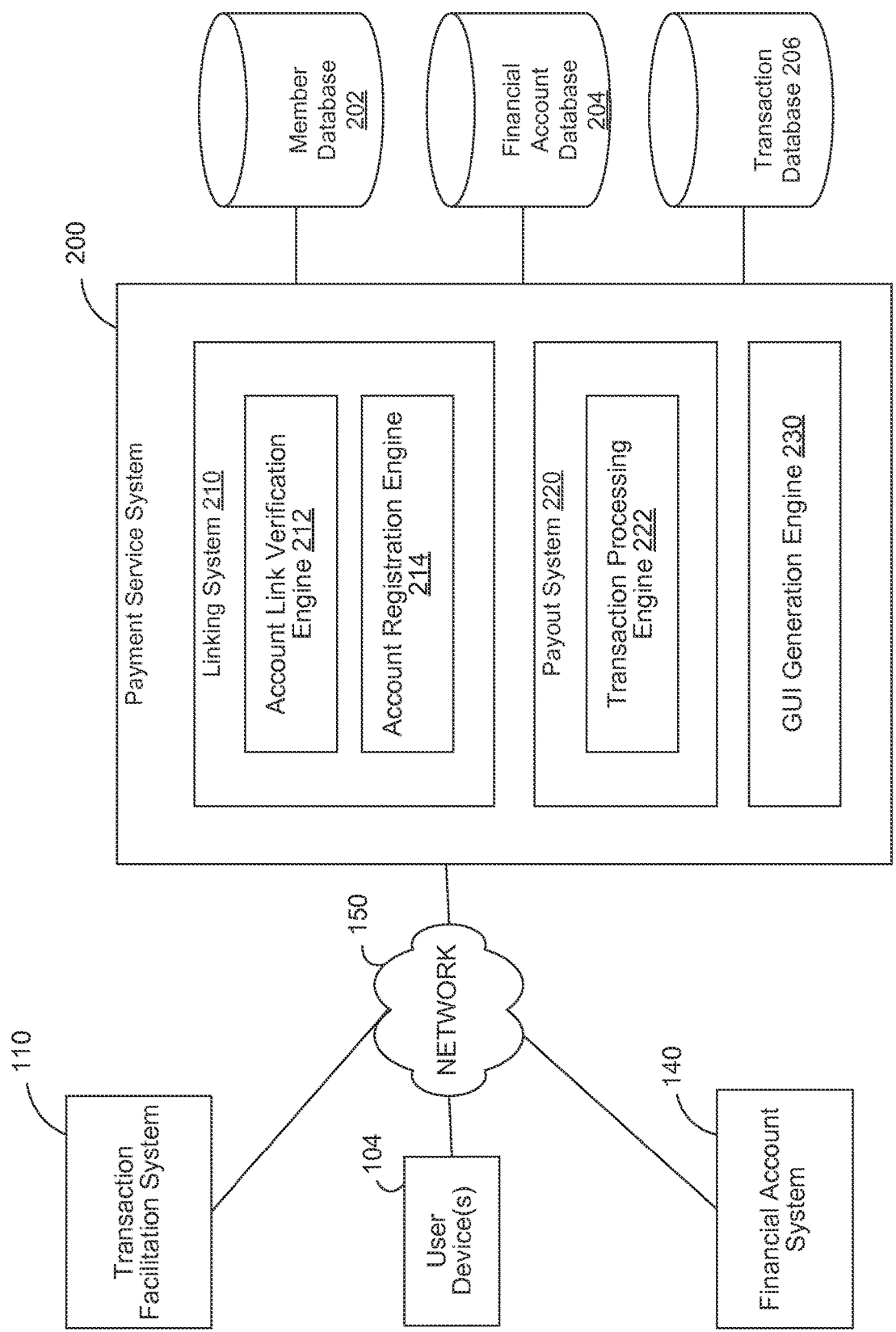
FIG. 2 is a block diagram illustrating various components of a payment service system executing the payout transfer technology.

FIG. 2 a block diagram illustrating various components of a payment service system 200, according to an embodiment. Note that certain components that are not germane to this description may not be shown. The payment service system 200 can be the payment service system 120 of FIG. 1. The payment service system 200 (or PSS 200) includes a linking system 210, a payout system 220, a graphical user interface (GUI) generation engine 230, and databases 202, 204, 206 for storing various sets of data.

The PSS 200 can communicate with the TFS 110 and/or the user device 104 to receive various types of data. The data can include: (a) data about the user 101, which can be stored in the member database 202; (b) data of one or more financial accounts of the user 101 and/or of the user 102, which can be stored in the financial account database 204; and (c) data of the financial transaction which involves directly or indirectly the intermediary transaction facilitator(s), where such data can be stored in the transaction database 206. Note that while the databases 202-206 are illustrated as three distinct databases, they can operate and/or be integrated as one database of the PSS 120. Further, the various types of data can be received from the TFS 110 in one set of data, e.g., in one communication message, as opposed to different sets of data, e.g., in several communication messages.

The data of the user 101 (or "member data") received from the TFS 110 can include information about a user account of the user 101 with the TFS 110. For example, the member data can include an email address submitted by the user 101 in registering with the TFS 110. The TFS 110 passes such account information to PSS for facilitating the payout transfer to the user 101. The member database 202 can include data other than the member data received from the TFS 110. For instance, the member database 202 can store its own member data (i.e., data of its own users), which includes user accounts of users of the PSS.

The data of one or more financial accounts of the user 101 (or "transaction data") can include information about any financial account information that the user 101 has provided to the TFS 110. The financial account information can include information related to a particular account (e.g., a bank account, an online money transfer account, a credit card account, etc.) of the user 101. For example, the information can be a debit card number of a debit card from a bank account of the user 101, an expiration date, a card verification value (CVV), and/or the name on the card (i.e., cardholder's name). In some instances, the financial account information is submitted by the user 101, at the TFS 110, in response to a prompt from the PSS. The PSS uses the financial account information in executing the payout transfer. In some instances, the financial account information is already stored in the financial account database 206 from a previous registration by the user 101 with the PSS (e.g., a registration to create a payment service account). That is, the user 101 may have, for example, an account with the PSS in addition to an account with the TFS 110. Accordingly, the financial account database 206 can store financial account information of its own users, in addition, to users of the TFS 110, where those users from the TFS 110 have opted in to create an account with the PSS to participate in the process for the payout transfer.

The data of the financial transaction (or "transaction data") can include information about any financial transaction, such as a payment transaction, that takes place in various scenarios involving the intermediary transaction facilitator(s). For instance, the financial transaction can occur between the user 101 and the user 102, where the user 101 carries out the financial transaction on behalf of an intermediary transaction facilitator. An example of such transaction is a taxi service offered by a driver to a passenger, on behalf of a taxi company.

In another instance, the financial transaction can occur between the user 102 and the intermediary transaction facilitator, where the user 101 is owed a compensation for such transaction. An example of such transaction is a purchase transaction in which a customer pays an online marketplace provider for goods handmade by an artist, where the artist is owed his percentage share for the purchase of the goods. Another example of such transaction is a service transaction in which a customer pays a service coordinator for home maintenance work performed by an independent contractor, where the independent contractor is owed his percentage share for the maintenance work. In another instance, the financial transaction can occur between the user 102 and the intermediary transaction facilitator, where it is the user 102 that is directly owed a payment for such transaction. An example of such transaction is an insurance transaction between an insured customer and an insurance agency, where the insured customer is owed an insurance payment.

The transaction data can include a total transaction amount, a payout amount, a transaction date, a transaction type, identification information of individuals involved in the transaction, payment information (e.g., financial account data associated with the method of payment), and the like. The identification information can include the user account of the user 101 involved in the transaction (directly or indirectly as discussed above with regards to the various scenarios involving the merchant entity), where the user account can include the user account with the TFS 110 and/or with the PSS 120. In some embodiments, the transaction data can include a predefined percentage for calculating the payout amount from a total transaction amount.

The linking system 210 includes an account link verification engine 212 and an account registration engine 214. The linking system 210 utilizes engines 212, 214 to analyze the various sets of data received from the TFS 110. The account link verification engine 212 is configured to verify whether the user 101 has a user account with the PSS (i.e., a payment service account) by comparing member data received from the TFS 110 with the PSS's own member data. For example, the account link verification engine 212 determines whether the email address of the user 101 matches an email address stored for an account member of the PSS. If there is a successful match, the account link verification engine 212 enrolls the user 101 in a direct payout payment process, in which the user 101 gets to receive monetary funds directly in his/her financial account. In some embodiments, the account link verification engine 212 performs an additional step to determine if the email address has been linked to a financial account by the user 101 in a previous interaction (e.g., account registration with the PSS). If there is an unsuccessful identification of a linked financial account, the account link verification engine 212 notifies the account registration engine 214. The account registration engine 214 causes a notification to be sent to the TFS 110 to prompt the user 101 to submit a financial account to be linked to the email address of the user 101. The notification can be generated using the GUI generation engine 230.

The user 101 can submit financial account information in response to the notification in order to establish the link. Upon completion of the registration performed by the account registration engine 214, payout transfers can be processed in the future for the user 101.

In some embodiments, the account link verification engine 212 notifies the account registration engine 214 if there is no successful match of the email address in the member database 202 of the PSS 200. In response, the account registration engine 214 causes a notification to be sent to the TFS 110 to prompt the user 101 to submit a financial account to be linked to the email address of the user 101. The notification can be generated using the GUI generation engine 230. In response to the notification, the user 101 can submit financial account information in order to establish the link. Linking of the financial account to the email address initiates the registration process for creating a user account with the PSS, i.e., a payment service account. The linking of the financial account is sufficient to create the payment service account, with no additional registration steps. Such techniques are advantageous because they allow the user to enroll in the payout payment process and receive future payout payments directly in the user's financial account, as identified by the payment card linked to the email address. Such payout payments can be received for services performed on behalf of the TFS 110, in addition to services performed on behalf of other TFS 110 that are associated, or affiliated, with the PSS 200. For example, enrollment through a taxi company's user account allows the user to receive payout payments with a housekeeping company, as long as the housekeeping company is also affiliated with the PSS 200. In this example, the user is advantageously set up to receive payout payments for multiple TFS's by merely setting up with only one TFS.

The payout system 220 includes a transaction processing engine 222. The transaction processing engine 222 processes all requests for payout transfers. The requests for payout transfers can come from the TFS 110, the user 101 using user device 104, the user 102 using user device 104, or a combination thereof. The transaction processing engine 222 processes the payout requests by communicating with the financial account system 140. The financial account system 140 can include one or more financial account systems that utilize one or more computer networks to facilitate financial transfers among financial accounts.

Figure 3:
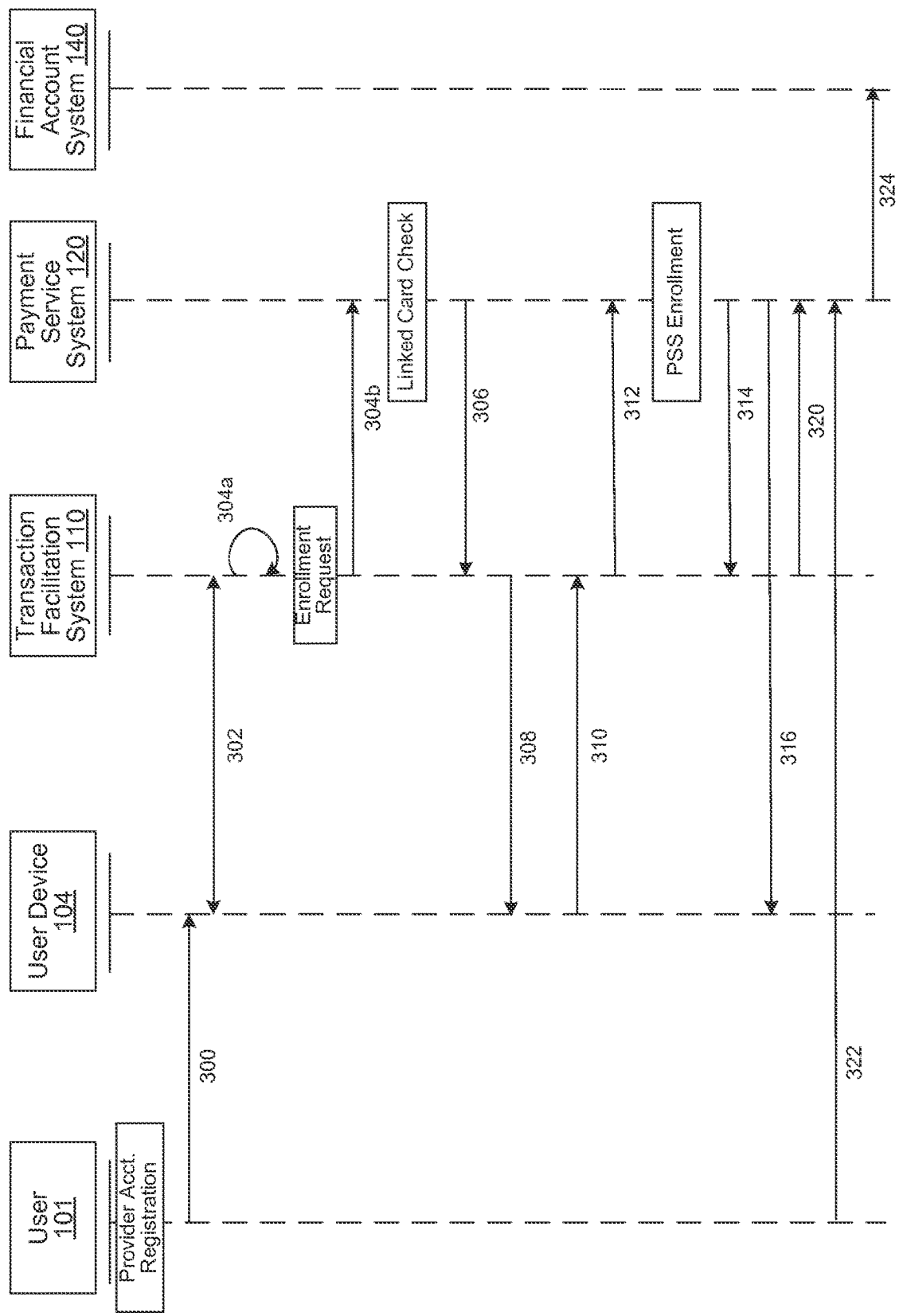
FIG. 3 is a sequence diagram illustrating a process for enrollment in a payout payment process associated with the payout transfer technology.

FIG. 3 is a sequence diagram illustrating a process for enrollment in a direct payout payment process associated with the payout transfer disclosed technology, according to one embodiment. For purposes of illustration only, the process of FIG. 3 is explained with reference to certain components illustrated in FIG. 1. The process begins at step 300, in which the user 101 initiates an account registration with the TFS 110 to access a platform application of the TFS 110. The service platform application can be a conventional software application in a processing device, such as a conventional desktop, a mobile application, or a website portal accessible via an internet browser on the processing device. At step 302, the user 101 requests to create a user account with the TFS 110 (i.e., account registration). The TFS 110 can start the account registration by prompting for certain information from the user, including, for example, a username for the account with the TFS 110 and an associated password for that username. The user 101 can respond to the prompt by submitting a username and a password to the TFS 110 (e.g., via a microphone, a keyboard, or a touch screen of the user device 104). In one example, the user 101 submits his/her email address as the username.

Either during the account registration process or at the completion of the registration process, the TFS 110 prompts, on a display of the user device 104, whether the user 101 would like to enroll in a direct payout payment process, where enrollment allows the user 101 to receive monetary funds directly in his financial account using payout transfer. An example of such prompt on a display is illustrated in a user interface 400 of FIG. 4A. The user 101 can decline the option to enroll and decide to receive the funds using traditional methods, such as Automated Clearing House (ACH) method or postal mailed check (e.g., paycheck mailed to a home address of the user 101). If the user 101 selects a traditional method, the TFS 110 prompts the user to submit account setup information for that method, as indicated in step 304a. For example, the TFS 110 prompts the user 101 to submit ACH related information including a routing number and a bank account number, where the user has to wait for a small deposit in his bank account to confirm the account setup is complete.

If the user 101 selects to enroll in the direct payout payment process using payout transfer, the TFS 110 forwards information about the user 101, such as account information, to the PSS 120, as indicated in step 304b. The information forwarded can include the username provided by the user 101 in the account registration with the TFS 110 at step 302. The username, for example, is an email address of the user 101. In another example, the username is a driver's license number of the user 101. Note any other identifiers may also be used as the username.

The PSS 120, upon receiving the email address (or any other identifier) of the user 101, performs a search for a matching email address in its database (e.g., member database 202). Note that the user 101 does not have to perform any extra step, and that the mere provision of this email address is sufficient for the PSS 120 to identify the user 101 in a database of the PSS 120. Identification of a matching email address indicates that the user 101 has an existing user account with the PSS (i.e., payment service account). In some embodiments, the identification of a matching email address can be performed by the PSS 120 identifying a payment service account within its database that is associated, or linked, with the email address (or any other identifier acting as the user account with the TFS 120). Upon finding a match, the PSS 120 then checks to see if a payment card (e.g., debit card, credit card, gift card, etc.) is linked to the email address. The linking of the email address with a payment card was stored, for example, when the user registered for a payment service account with the payment service system. The payment card identifies the financial account of the user, and as such allows the PSS 120 to identify which financial account to transfer the payout payment for the user.

Note that for the sake of simplicity, a debit card is used in the following discussion. Further note that, in some instances, there may not be a payment card linked to the email address, even if the payment service account exists for the user 101. For example, the user may have created a payment service account, but have not completed the process by entering the payment card information.

At step 306, the PSS 120 transmits a message to the TFS 110 to indicate the result of the search for a matching email address and/or a linked debit card. If the email address and the linked debit card are found, the PSS 120 enrolls the user 101 in the direct payout payment process. In some embodiments, enrollment can include linking the payment service account with the user account of the TFS 110. In some embodiments, enrollment can include associating the payment service account with the TFS 110 (e.g., update a database field entry of the payment service account). For example, the payment service account is linked to the email address, which is the username associated with the user account of the TFS 110, and is linked to the TFS 110 by having a marker indicating that the payment service account holder is also an account holder of the TFS 110.

In some embodiments, if no email address is found (i.e., the user 101 does not have a payment service account with the PSS 120), the message sent at step 306 causes the TFS 110 to generate a notification prompting the user 101 to create a new account with the PSS 120 by linking a debit card, as indicated in step 308. Such new account creation constitutes enrollment of the user 101 in the direct payout payment process. An example of a prompt to link a debit card is illustrated in a user interface 410 of FIG. 4A. Note, however, that the user interface 410 of FIG. 4A may be generated in certain embodiments where the user 101 has a payment service account, but does not have a payment card linked to the payment service account and/or the identifier of the user 101 (e.g., email address).

To link a debit card, the user 101 submits debit card information (e.g., name, card number, card expiration date, and card verification value (CVV)), as indicated in step 310. The TFS 110 forwards the information to the PSS 120, as indicated in step 312. The PSS 120 then creates a new payment service account with the PSS for the user 101 by using (a) the username (i.e., email address) forwarded from the TFS 110 and (b) the newly linked debit card submitted from the user 101.

The disclosed technology is advantageous in that the mere provision of an email address by the user 101 (and nothing more (e.g., sign-up process with many complicated steps)) can initiate the payout transfer enrollment process and can create a new payment service account for the user 101. Further, the email address has already been in existence (with the TFS 110) and passed on to the PSS 120, requiring no additional effort from the user 101 and allowing a seamless account registration process with the PSS 120. In the scenario where no debit card is found for the matching email address, the steps 308-312 are repeated to obtain debit card information for linking.

In some embodiments, the PSS 120 allows the user to receive payout payments at other TFS's by using the same payout payment process, so long as the user 101 has enrolled at one TFS (e.g., TFS 110). For example, a user, who does not have a payment service account, enrolls in a payout payment process through a housekeeping company to receive direct payout payments for his housekeeping services facilitated by that company. Once the user enrolls, the PSS 120 automatically creates the payment service account for the user. The user may then choose to work a second job as a taxi driver. Now that the user has a payment service account through the enrollment with the PSS 120 at the housekeeping company, the PSS 120 can automatically transfer payout payments for the taxi services once the PSS 120 receives the user's identifier (e.g., email address), without requiring any other information from the user. That is, the user is not required to go through another set-up with the taxi company in order to receive his payout payments. The taxi company can pass the user's identifier to the PSS 120, which can identify (a) an identifier match in its system, (b) an association between the identifier and the payment service account, (c) and a linked payment card to that payment service account, and can then process the payout request for the taxi company by causing the monetary funds to be transferred using the identified information (e.g., payment service account and payment card). As discussed above, the PSS 120 can cause the monetary funds to be transferred by communicating with a network of computer systems that facilitate the user's financial account identified by the payment card, the financial account associated with the taxi company, and/or the financial account associated with the PSS 120 itself. Each of these financial accounts can be part of a financial account system, e.g., system 140.

In response to completion of the enrollment, the PSS 120 can perform at least one of the following two additional operations. Note that steps 314 and 316 can be performed in any order or concurrently. At step 314, the PSS 120 sends a successful enrollment message to the TFS 110. At step 314, the TFS 110 receives the successful enrollment message sent by the PSS 120 and, in response, the TFS 110 outputs a conventional successful enrollment indication to the merchant entity (e.g., an administrator or merchant). The indication may be in the form of, for example, a message displayed on a display device.

In some embodiments, the PSS 120 can transmit a virtual confirmation to the TFS 110 for displaying on the user device 104 of the user 101, as indicated at step 316. The virtual confirmation message contains information regarding the enrollment, i.e., confirmation, including whether the enrollment has been approved, the details of the enrollment, and the process for future payout payment transactions. In at least some embodiments, the virtual confirmation message also contains instructions to the user 101 on how to initiate a payout transfer (e.g., instructions to download a mobile payment application). In such embodiments, the user 101 is able to request the payout transfer himself, as opposed to the TFS 110 requesting the payout transfer on behalf of the user.

With the enrollment complete, the TFS 110 can carry out every future payout payment to the user 101 without having the user 101 provide additional information (e.g., user account login, financial account setup, etc.). That is, monetary funds can be directly transferred to the financial account of the user 101 substantially instantaneously subsequent to a request for the payout transfer. The payout transfer can be performed by the transaction processing engine 222 of the payout system 220 of FIG. 2.

In some embodiments, the TFS 110 can request the payout transfer by sending a request message to the PSS 120, as indicated by step 320. In some embodiments, the TFS 110 transmits the request for the payout transfer in response to receiving a request from the user 101 for a payout payment. In some embodiments, the TFS 110 transmits the request for the payout transfer as an automated process configured by an administrator of the TFS 110. In such embodiments, the automated process can be triggered in response to a payment transaction completed by the user 101 with, e.g., the user 102, where the payment transaction, for example, is instantiated on a point-of-sale terminal facilitated by or associated with the TFS 110. The TFS 110, in response to receiving an indication that the payment transaction is complete (e.g., rider pays taxi driver for the taxi ride), can trigger the automated process to request that a portion, or all, of a transaction amount (e.g., a payout amount that is a portion of a total transaction amount paid by the rider to the taxi company) be paid out to the user 101. For example, the TFS 110 sends a payout payment request automatically to the PSS 120 to transfer a portion of the total payment amount received from the rider to the taxi driver, where that portion amount is determined by a business agreement between the TFS 110 and the taxi driver (i.e., user 101).

The request message included in the payout transfer request can include simply the email address of the user 101 and payment transaction information, such as payout payment amount to pay the user 101. The PSS 120 can determine the identity of the user 101 by using the email address, and it can transfer the funds (as specified in the payment transaction information) to the financial account associated with the email address. The PSS 120 can determine the financial account based on payment account information of the debit card linked to the email address of the user 101. In some embodiments, the PSS 120 can identify the user 101 by performing a lookup of an enrollment status associated with the email address of the user 101, and process the payout transfer upon identifying that the user 101 is enrolled.

In some embodiments, the request message can include user account information of the user 101 with the TFS 110. In some embodiments, the PSS 120 can identify the user 101 by identifying a stored association between a username, which is included in the received user account information, and a payment service account with the PSS 120. For example, the PSS 120 searches its own database to find the unique username (e.g., bernice@gmail.com) associated with a payment service account (e.g., bernice@gmail.com).

In some embodiments, the PSS 120 can identify the user 101 by identifying a stored user account matching the user account received from the PSS 120, identifying a payment service account corresponding to that stored user account, and process the payout transfer for that payment service account. For example, the user account information includes a username unique to the TFS 110. In such example, the PSS 120 searches its own database to find the unique username (user101@providersystem.com) and to find a payment service account (e.g., bernice@gmail.com) corresponding to that unique username.

In some embodiments, the user 101 can request the payout transfer by sending a request message, via the network 150, to the PSS 120, as indicated by step 322. In such embodiments, the user 101 can send the request message via a payment application configured to communicate with the PSS 120. The payment application can be running, or executing, on the user device 104 belonging to the user or another computing device belonging to the merchant entity associated with the TFS 110. The payment application can be a mobile application or a conventional software application. The payment application can operate as a POS terminal for conducting financial transactions on behalf of the merchant entity. Similar to the request message transmitted by the TFS 110, the request message from the user 101 can include an identifier of the user 101 and a payout payment amount. The identifier can be transmitted independently (e.g., an email address input) or as data included in user account information associated with the user (e.g., payment service account information and/or TFS's user account information).

In some embodiments, the request message can be transmitted to the PSS 120 as part of a financial transaction completed between the user 101 and a customer, e.g., user 102. For example, the user 102 provides her debit card information to pay and approve the charge for a taxi ride. Upon approval of the charge, the request message is sent to the PSS 120 and the payout payment (e.g., funds) is transferred directly, for example, to a bank account of the user 101. The payout transfer is substantially instantaneous subsequent to the approval by the user 102. For example, at the moment the customer pays for the taxi ride, the PSS 120 can receive a notification from the taxi company (e.g., TFS 110) to perform the electronic funds transfer to the driver's financial account. In another example, the user 102 provides her credit card information to pay and approve the charge for the taxi ride. Upon approval of the charge, the request message is sent to the PSS 120 and the payout payment (e.g., a credit charge-back) is transferred directly, for example, to a credit card account of the user 101. The payout transfer is substantially instantaneous subsequent to the approval by the user 102.

In some embodiments, upon receiving the request for payout transfer, the PSS 120 executes the transfer of funds by communicating with the financial account system 140, as indicated in step 324. For example, the PSS 120, utilizes the payment card stored in association with the payment service account of the user 101 to request a financial account associated with the payment card to receive funds transferred from another financial account associated with the TFS 110. In another example, the PSS 120 utilizes the payment card stored in association with the payment service account of the users 101 and 102, respectively, to request their respective financial accounts to transfer and receive the funds.

Figure 4B:
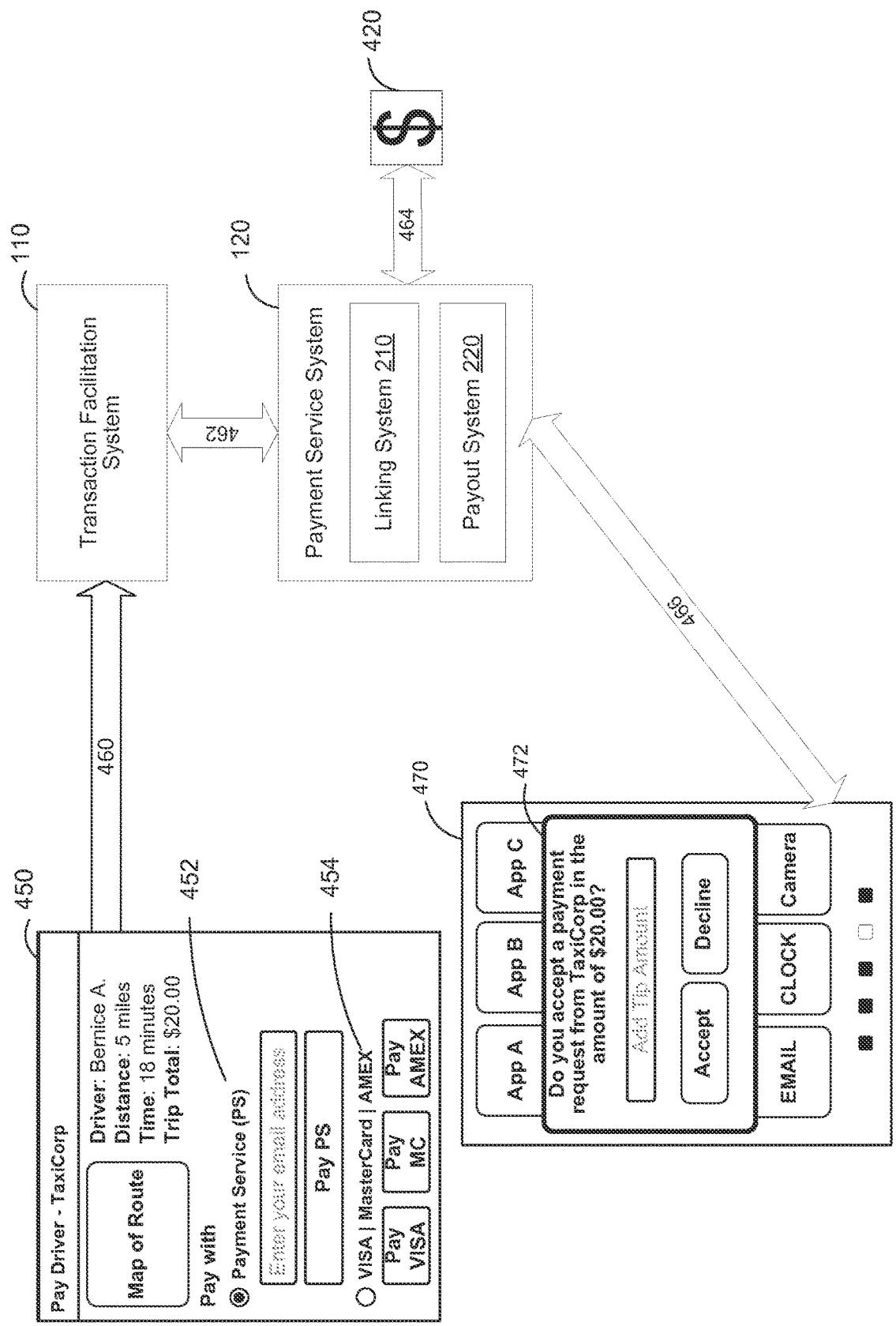
Figure 4C:
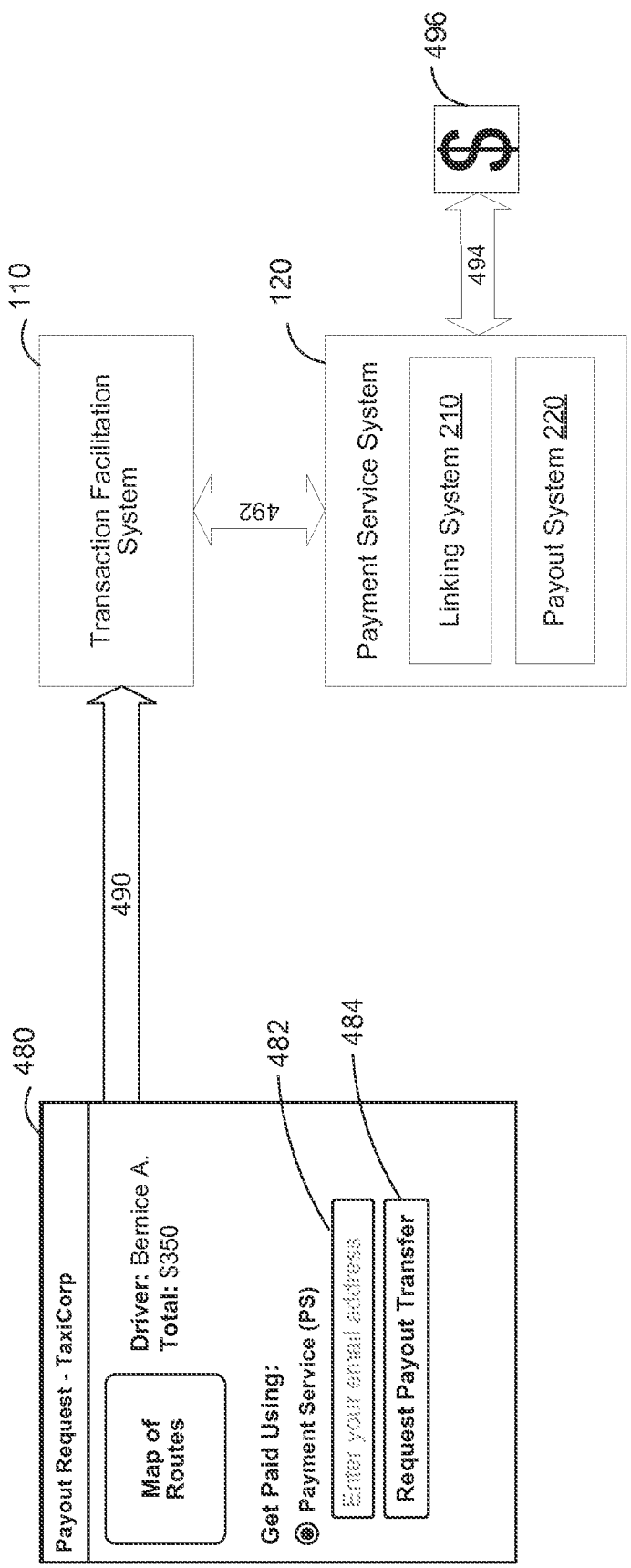

FIGS. 4A-4C are user interface diagrams illustrating examples relating to a payout payment flow according to various embodiments of the disclosed technology. FIG. 4A is a user interface diagram illustrating enrollment in the direct payout payment process, in which the user 101 can receive funds via payout transfer, according to some embodiments. The user 101 can initiate the enrollment process either during a registration stage with the TFS 110 or at the completion stage of the registration (i.e., creation of the user account). In either stage, the user 101 arrives at a user interface 400 in which the user 101 can initiate the enrollment process. In particular, the TFS 110 presents the user interface 400 for the user 101 to select an option for how to receive funds (i.e., "Get Paid"). The user 101 can select a traditional process 404 (e.g., "Get Paid Using ACH") or the payout transfer process 402 of the disclosed technology (e.g., "Get Paid Using Payment Service").

Upon receiving the selection of the user 101 (i.e., 430), the TFS 110 can decide what to present next to the user 101. For instance, if the user 101 chooses to get paid using ACH, the provider service 110 generates another user interface (not shown) to prompt the user 101 to submit a routing number and an account number to enroll the user in the ACH process. For instance, if the user 101 chooses to get paid using the payment service (i.e., the payment service executed using the PSS 120), the TFS 110 sends such selection, or request for enrollment, to the PSS 120. The request for enrollment, transmitted by the TFS 110, includes a username of the user account with the TFS 110. In some embodiments, the username is a personal email address submitted by the user 101 in the registration. In some embodiments, the username is a unique identifier. The unique identifier can be, for example, a telephone number.

The PSS 120 uses the identifier to search for a matching identifier in its database. This can be performed, for example, by the linking system 210. In particular, the account link verification engine 212 of the linking system 210 searches the database for a match and determines if there is a financial account associated with the identifier. An example of such database is shown in FIG. 5. For example, the account link verification engine 212 compares an email address identifier received from the TFS 110 to find a matching email address and identifies a debit card corresponding to that email address. An identification of an email address and a linked debit card is indicative of the user 101 having an existing payment service account with the PSS. Note, however, the user 101 may have an existing payment service account with the PSS that is linked to the email address, but may still not have a linked debit card. As such, an identification of the email address enables the PSS to identify the payment service account of the user 101 with the PSS, but still requires the PSS to prompt the user 101 to link a debit card.

If no linked debit card is found or if no matching identifier is found (i.e., no payment service account), the PSS 120 transmits a message to the TFS (i.e., 434) to report the result. Further, the PSS 120 transmits a notification to be displayed on the user device via a user interface 410 to prompt the user 101 to link a card. Upon the user's submission of the card information, such as cardholder's name, card number, expiration date, and a security code, the PSS enrolls the user 101 for direct payout payment process. The account registration engine 214 of the linking system 210 can perform the enrollment process. Once the user 101 is enrolled, payout transfers can be performed for future transactions in which the user 101 requests for a payout payment. For example, the TFS 110 can request the PSS for a payout transfer to the user 101 (e.g., Pay this Employee"), and a payout payment 420 is transferred to a financial account of the user instantaneously, or substantially instantaneously. In one embodiment, the payout system 220 can perform the payout transfer by using the payment card information associated with the linked card to communicate with the financial account of the user 101 (e.g., via financial account system 140). In some embodiments, the payout system 120 communicates with a financial account associated with the TFS 110 to transfer monetary funds directly to the financial account of the user 101.

In some embodiments, the payout system 220 communicates with a financial account associated with the PSS 200 to transfer monetary funds directly to the financial account of the user 101. In such embodiments, the payout system 220 can subsequently request a reimbursement from a financial account associated with the TFS 110. Such reimbursement requests can be executed, for example, on a daily basis (e.g., end of business day), on a monthly basis (e.g., end of business day of the last Friday of the month), on a yearly basis (e.g., end of business day of the last Friday of the year), etc.

FIG. 4B is a user interface diagram illustrating a payout payment flow in which the user 101 receives funds via the payout transfer having enrolled in the direct payout payment process, according to some embodiments. Note that while the transaction flow described here utilizes an email address as an identifier for the payout transfer, other identifiers, such as a phone number, an application identifier, or the like, can also be utilized.

In the illustrated embodiment, consider a scenario where a taxi driver (e.g., user 101) has finished a taxi ride service with a customer (e.g., user 102). The taxi driver shows the customer a receipt presented on a user interface 450 displayed via a mobile payment application running a computing device of the taxi driver, such as the user device 104. The receipt allows the customer to choose a payment option from the options 452, 454. If the customer chooses option 454 to pay using a traditional method, such as via a credit card payment method with Visa, Mastercard, or AMEX, the transaction information, including the payment information is transmitted to a financial processing system (e.g., acquirer, card payment network, and issuing bank), which processes the credit charge. Note for the sake of simplicity, the scenario for option 454 is not discussed in detail here, since it is not germane to the disclosed technology.

If the customer chooses option 452 to pay using the payment service, a transaction message is transmitted from the computing device to the TFS 110 (i.e., step 460). The transaction message is indicative of the occurrence of the taxi service transaction and can include transaction information about the taxi service, such as a total transaction amount (and/or a payout amount that is a portion of the total transaction amount), distance traveled, trip time, payment information (e.g., payment method, payment card number, etc.), and/or identification information about the driver. The identification information about the driver can include an identifier. The identifier can be, for example, an email address or an application ID (e.g., an ID identifying that the application running on the device is associated with the TFS 110).

In some embodiments, upon choosing the option 452, a notification can be displayed via the mobile payment application to prompt the customer to submit a customer identifier that identifies a payment service account of the customer with the payment service implemented by the PSS 120. The customer identifier can be, for example, the customer's email address. The customer identifier can be included in the transaction message and transmitted to the TFS 110 along with the transaction information and the identification information.

Upon receiving the transaction message, the TFS 110 determines whether the taxi driver is enrolled in the direct payout payment process based on the driver's identification information. The determination can be performed, for example, by accessing a user account database of the TFS 110. Upon determining the taxi driver is enrolled, the TFS 110 forwards, or transmits, at least a portion, or all, of the transaction message to the PSS 120 as a transaction approval request message (i.e., step 462). In one example, the TFS 110 forwards the taxi driver's identification information and a payout amount as a request for the PSS 120 to generate a payout payment for the taxi driver. In another example, the TFS 110 forwards only the driver identifier (extracted from the identification information) and the total transaction amount to the PSS 120.

In such example, the PSS 120 identifies the driver using the driver identifier, determines the percentage share of the total transaction amount that should be paid to the driver, and calculates the payout amount based on the percentage share to generate the payout payment 420. The percentage share can be a part of a contract agreement between the TFS 110 and the driver.

In some embodiments, the PSS 120 can determine the percentage share by accessing a database of the PSS 120, where the TFS 110 has transmitted the percentage share information to the PSS 120 for storage, as part of the enrollment process of the driver with the PSS 120. Upon successful identification of the driver and the payout amount, the PSS 120 generates the payout payment 420 for the driver (i.e., step 464) as requested in the transaction approval request message.

In some embodiments, the PSS 120 also communicates result of the transaction approval request message (e.g., approve or deny "Pay with PS") to the user 101 via the mobile payment application. The payout system 220 can execute the payout transfer to generate the payout payment 420. The payout system 220 can cause the payout payment 420 to be transferred, for example, to a bank account of the driver. Such payout transfer occurs instantaneously, or substantially instantaneously, after the customer has made the payment to the facilitator of the TFS 110. That is, once the customer makes the payment to the TaxiCorp, the driver can receive his share within a short time period, unlike traditional methods (e.g., wait for 3 days to receive funds in bank account).

In some embodiments, the linking system 210 of the PSS 120 performs the determination of enrollment in coordination with the TFS 110. In such embodiments, the TFS 110 forwards the transaction message to the PSS 120 as a transaction approval request. When the PSS receives the transaction approval request, the PSS 120 determines whether to approve or deny the request by verifying whether the taxi driver is enrolled in the direct payout payment process. The PSS 120 can make this determination, for example, by accessing its database to find a linkage association between the taxi driver's email address and the TFS 110. In some embodiments, the PSS 120 communicates the result of the request (e.g., approved or denied) to the user 101 via the mobile payment application, and then generates the payout payment 420 for the driver (i.e., step 464). In some embodiments, the PSS 120 performs step 464 without notifying the user 101.

In some embodiments, in response to receiving the transaction approval request message, the PSS 120 also sends a message requesting approval for the transaction to the customer (i.e., step 466). In some instances, where the device used to initiate the transaction to pay the taxi driver belongs to the customer, the PSS 120 sends the message to the same device. The PSS 120 can determine that the device initiating the transaction belongs to the customer based on a device ID previously associated with the customer's identifier, e.g., email address. In other instances, where the device belongs to the taxi driver, the PSS 120 identifies a mobile device associated with the customer and transmits the message to that mobile device. The PSS 120 can identify the mobile device by performing a database lookup, based on an association between the customer's identifier, e.g., email address, and the mobile device, which the customer has previously specified to the PSS. The PSS 120 then sends to the customer's mobile device a message directed to a mobile payment application installed on the device. The mobile payment application on the customer's mobile device 470 can be the same application used to initiate the transaction to pay the taxi driver. The message is configured to cause the mobile payment application to output to the customer a user interface 470 that prompts the customer with a notification 472 to approve the total transaction amount (and/or add an additional amount for tip). In the scenario that both the PSS 120 and the customer approve the transaction, the PSS 120 then executes or triggers a payout transfer to generate the payout payment 420 for the driver (i.e., step 464). That is, the payout system 220 of the PSS 120 causes funds to be transferred from the customer's bank account to the taxi driver's bank account.

In some embodiments, the user 102 can utilize a mobile payment application associated with the PSS 120 to initiate a payout transfer. Using the mobile application, the user 102 can submit the identifier of the user 101 and the identifier of the user 102. In such embodiments, the mobile payment application can forward the identifiers to the PSS. The PSS 120 can identify (a) a payer payment card associated with the payer user's identifier, where the payer payment card is indicative of a payer financial account, and (b) a payee payment card associated with the payee user's identifier, where the payee payment card is indicative of a payee financial account. The PSS 120 can identify such information by accessing a database of the PSS, where the database includes one or more payment cards and one or more identifiers (e.g., email addresses). The PSS 120 can then identify a particular payment card that corresponds to the payer user's identifier and another particular payment card that corresponds to the payee user's identifier. Once the PSS 120 has identified such information, the PSS 120 can execute, or trigger execution of, the payout transfer to transfer monetary funds from the payer financial account to the payee financial account.

FIG. 4C is a user interface diagram illustrating a payout payment flow in which the user 101 requests for funds to be transferred using the payout transfer technology, according to some embodiments. As noted above, while the transaction flow described here utilizes an email address as an identifier for the payout transfer, other identifiers, such as a phone number, can also be utilized. In the illustrated embodiment, consider the taxi driver (e.g., user 101) has completed his taxi services for the day and wishes to get paid by the taxi company for those services. The taxi driver utilizes a user device to access a user interface 480 of a payout request system of the taxi company. The taxi driver requests for a payout payment by submitting his email address (i.e., identifier) in an identifier input field 482. In some embodiments, the user interface 480 may not include the identifier input field 482, and the taxi driver simply submits the payout request by "clicking" the "Request Payout Transfer" button 484. In such embodiments, an identifier associated with the taxi driver is automatically sent to the TFS 110. For example, an application identifier executing the user interface 480 is sent as the identifier of the taxi driver. In another example, the device identifier of the user device used by the taxi driver is sent as the identifier to the TFS 110. In yet another example, the taxi driver is able to access the user interface 480 by logging into the TFS 110, and as such, the username for the login is automatically sent along with the payout request to the TFS 110.

Upon submission of the payout request, the request is sent to the TFS 110, as indicated by step 490. The TFS 110 forwards the payout request along with the identifier of the taxi driver to the PSS 120, as indicated in step 492. In some embodiments, the TFS 110 determines whether to approve the payout request before sending the request to the PSS 120. Similar to the discussion above with respect to FIGS. 4A-4B, the PSS 120 utilizes the linking system 210 and the payout system 220 to process the payout request, as indicated by step 494. In particular, the payout system 220 can cause a payout payment 496 to be transferred, for example, to a bank account of the driver.

Figure 6:
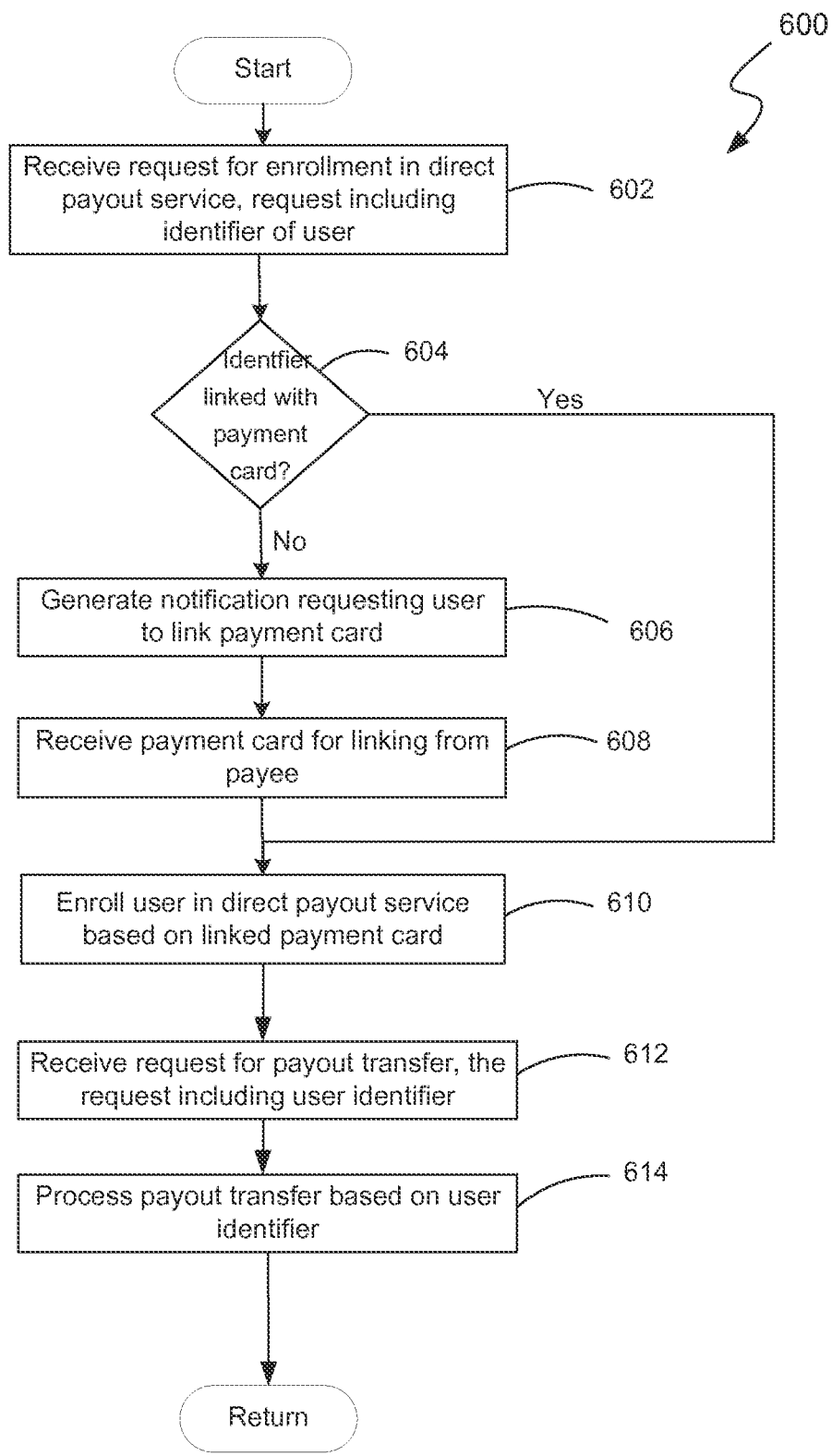
FIG. 6 is a flow diagram illustrating a process for generating a payout payment.

FIG. 6 is a flow diagram illustrating a process for payout transfer. For purposes of illustration only, the process of FIG. 6 is explained with reference to certain elements illustrated in FIG. 1. The process begins at step 602, in which the PSS 120 receives, from the TFS 110, an enrollment request message of a user of the TFS 110 to enroll in a direct payout service. The enrollment request message includes an identifier of the user. At step 604, the PSS 120 determines whether the identifier is linked to a payment card. The linkage can be, for example, a previously stored association between the identifier and the payment card. For example, a database of the PSS 120 includes an email address of the user linked to a payment card number of a debit card. If the identifier is linked to a payment card, the PSS 120 enrolls the user in the direct payout service, as indicated in step 610.

Upon failure to identify a payment card linked to the identifier, the PSS 120 generates a notification to prompt the user to link a payment card, as indicated in step 606. At step 608, the PSS 120 receives payment card information from the user for linking the payment card. The payment card information can include, for example, a cardholder's name, a card number, a card expiration date, and a CVV. At step 610, the PSS 120 enrolls the user in the direct payout service.

At step 612, the PSS 120 receives a request for a payout transfer to a particular user, the request including an identifier of the user. In some embodiments, the request can be received from the user 101. In some embodiments, the request can be received from the TFS 110, at which the user 101 has enrolled (and obtained a payment service account) with the PSS 120. In some embodiments, the request can be received from another transaction facilitation system (i.e., a "second TFS") that is associated with the PSS 120, as opposed to being received from the original TFS 110 at which the user 101 has enrolled with the PSS 120. In such embodiments, the user 101 is able to take advantage of the enrollment process with the TFS 110 to obtain a payout payment from the second TFS. Because the second TFS is associated with the PSS 120, the user 101 does not need to create another user account with the second TFS in order to receive payout payment via the PSS 120. As long as the user 101 provides the second TFS with the identifier, the second TFS can transmit this identifier to the PSS 120.

Upon receiving the identifier, the PSS 120 can identify a payment service account with the PSS 120 based on the identifier, can further identify a financial account associated with that payment service account, and can process the payout transfer to the user 101 (e.g., step 614). Processing the payout transfer can include causing, on behalf of the second TFS, the payout payment to be transferred to the financial account associated with the user 101. In some embodiments, the PSS 120 communicates with a financial account associated with the second TFS to request the transfer of the payout payment directly from that financial account to the financial account associated with the user 101. In some embodiments, the PSS 120 can transfer the payout payment from a particular financial account associated with the PSS 120 to the user's financial account on behalf of the second TFS. In such embodiments, the PSS 120 can subsequently request and receive a reimbursement for the payout payment from a financial account associated with the second TFS.

At step 614, the PSS 120 processes the payout transfer for the particular user based on the identifier. In particular, the PSS 120 identifies whether the user has a payment service account with the PSS 120. In some embodiments, the PSS 120 identifies the payment service account by determining whether the particular user is enrolled in a direct payout service. In such embodiments, if the particular user is the user who has enrolled in the direct payout service in step 610, the PSS 120 can identify an association between the identifier and the payment service account, where the association has been stored in step 510 during the enrollment. In some embodiments, the PSS 120 identifies the payment service account by determining whether the identifier is associated with the payment service account from any other previously stored association. For example, the user 101 has created a payment service account separate from the enrollment process in step 610.

Upon identifying the payment service account, the PSS 120 proceeds with the payout transfer. In particular, the PSS 120 determines the payout amount (or a transaction amount and associated portion of the transaction amount) and generates a payout payment based on the payout amount by causing monetary funds to be transferred to the financial account identified by the payment card associated with the identifier (and the payment service account), where the payment card has been provided in step 608. In some embodiments, the PSS 120 communicates with a financial account associated with the TFS 110 to request the transfer of the payout payment directly from that financial account to the financial account associated with the user 101. For example, the PSS 120 can execute a debit rail process to request monetary funds to be transferred from a debit card financial account associated with the TFS 110 to a debit card financial account associated with the user 101. Note that in such embodiments, other monetary transfer processes can be utilized to execute the payout transfer, including, for example, an automated clearing house (ACH) process, an automated teller machine (ATM) rail, or a credit card chargeback process. The monetary transfer process utilized by the PSS 120 depends on the type of the payment mechanisms respectively linked to the TFS 110 and the user 101. For example, the user 101 may link a credit card, as opposed to a debit card, to an identifier of the user 101. In such example, the PSS 120 can execute a credit card chargeback to transfer the payout payment to the credit card financial account of the user 101 at step 614.

In some embodiments, the PSS 120 can transfer the payout payment from its own financial account to the financial account associated with the user 101, on behalf of the TFS 110. In such embodiments, the PSS 120 can subsequently request and receive a reimbursement for the payout payment from a financial account associated with the TFS 110.

Figure 7:
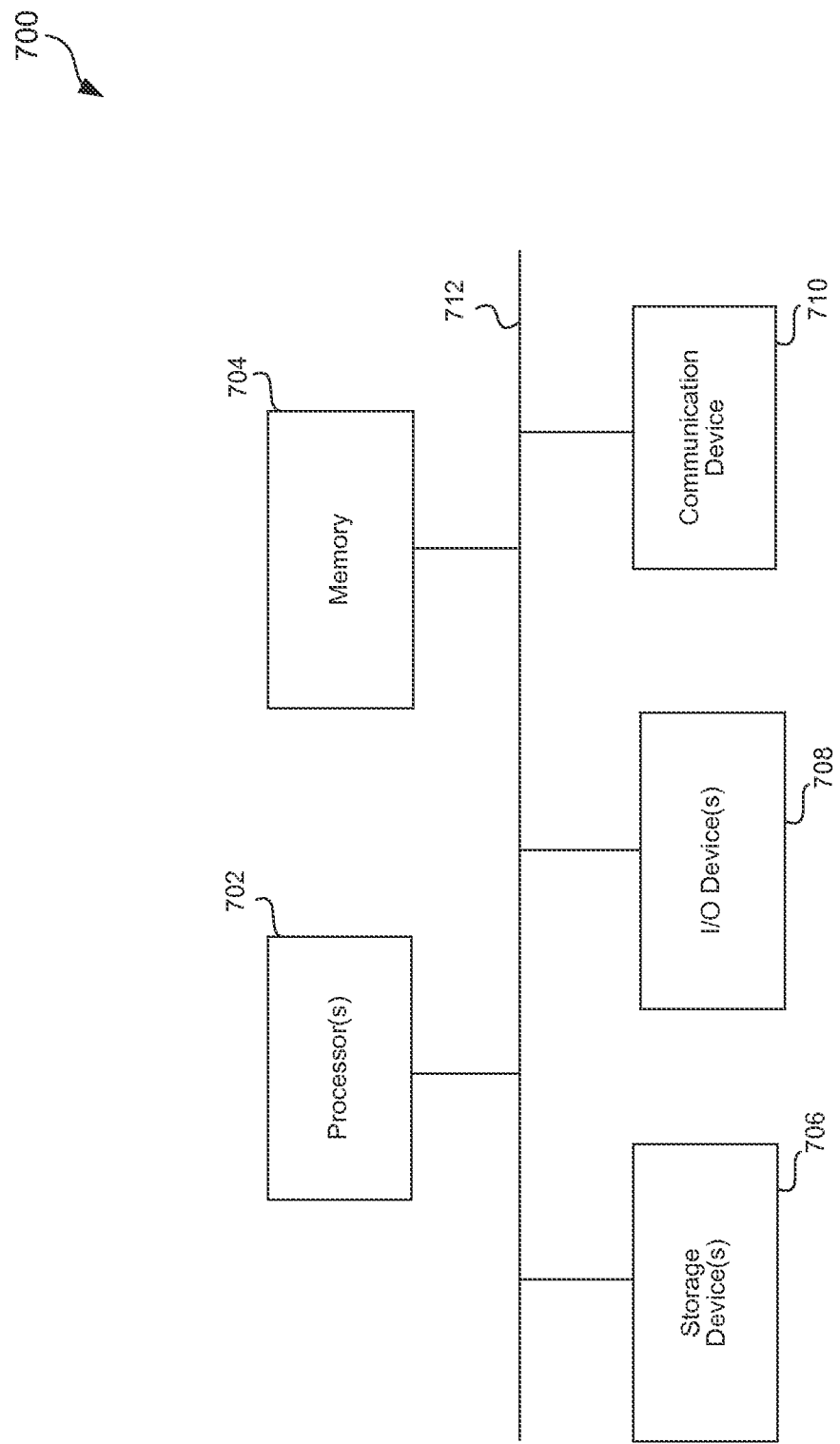
FIG. 7 is a high-level block diagram showing an example of a processing system in which at least some operations related to the payroll technology can be implemented.

FIG. 7 is a high-level block diagram showing an example of a processing system 700 that can represent any of the computing devices described above, such as the mobile device 104, the TFS 110, or the payment service system 120. Note that any of these systems may include two or more processing devices such as represented in FIG. 7, which may be coupled to each other via a network or multiple networks.

In the illustrated embodiment, the processing system 700 includes one or more processors 702, memory 704, a communication device 710, one or more input/output (I/O) devices 708, and one or more storage devices 706, all coupled to each other through an interconnect 712. The interconnect 712 may be or include one or more conductive traces, buses, point-to-point connections, controllers, adapters and/or other conventional connection devices.

The processor(s) 702 may be or include, for example, one or more general-purpose programmable microprocessors, microcontrollers, application specific integrated circuits (ASICs), programmable gate arrays, or the like, or a combination of such devices. The processor(s) 702 control the overall operation of the processing device 400. Memory 704 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 704 may store data and/or instructions that configure the processor(s) 702 to execute operations in accordance with the disclosed technology described above. The communication device 710 may be or include, for example, an Ethernet adapter, cable modem, Wi-Fi adapter, cellular transceiver, Bluetooth transceiver, or the like, or a combination thereof. Depending on the specific nature and purpose of the processing device 700, the I/O devices 708 can include devices such as a display (which may be a touch screen display), audio speaker, keyboard, mouse or other pointing device, microphone, camera, etc. The storage devices 706 can be one or more local or remote databases accessible via the communication device 710.

Unless contrary to physical possibility, it is envisioned that (i) the methods/steps described above may be performed in any sequence and/or in any combination, and that (ii) the components of respective embodiments may be combined in any manner.

The disclosed technology can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the disclosed technology here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
receiving, by a payment service, first payment data and a first identifier associated with a first user, wherein the first payment data is linked to the first identifier and stored (i) in a datastore of the payment service and (ii) in association with a first user account of the payment service;
receiving, by the payment service, second payment data and a second identifier associated with a second user, wherein the second payment data is linked to the second identifier and stored (i) in the datastore of the payment service and (ii) in association with a second user account of the payment service;
receiving, by the payment service and via a mobile application associated with the payment service, a request for a near-instantaneous transfer of a payment for a transaction between the first user and the second user, the request including data, the data including at least one of the first identifier or the second identifier, wherein the payment includes an amount of funds, and wherein a first amount of the funds is to be transferred to a financial account of the first user and a second amount of the funds is to be transferred to an account of a service provider with which the first user is associated; and
in response to receiving the request:
identifying, by the payment service and based on a lookup in the datastore using the data, the first user account and the second user account; and
causing, by the payment service and upon receiving a confirmation message via the mobile application, the near-instantaneous transfer of at least the payment of the first amount to the financial account of the first user upon completion of the transaction between the first user and the second user.

2. The method of claim 1, wherein the first user account is created for the first user upon receiving the request.

3. The method of claim 1, further comprising:
updating the datastore to include the first user account including the first payment data.

4. The method of claim 1, wherein the request is received from a transaction facilitation system associated with the service provider.

5. The method of claim 1, further comprising:
generating a notification to be transmitted to a mobile device associated with the second user, the notification confirming the payment.

6. The method of claim 1, wherein the financial account of the first user is associated with a financial institution.

7. A system comprising:
one or more memories having computer-readable instructions stored thereon; and
one or more processors configured to execute the computer-readable instructions to:
receive, by a payment service, first payment data and a first identifier associated with a first user, wherein the first payment data is linked to the first identifier and stored (i) in a datastore of the payment service and (ii) in association with a first user account of the payment service;
receive, by the payment service, second payment data and a second identifier associated with a second user, wherein the second payment data is linked to the second identifier and stored (i) in the datastore of the payment service and (ii) in association with a second user account of the payment service;
receive, by the payment service and via a mobile application associated with the payment service, a request from the first user for a near-instantaneous transfer of a payment for a transaction between the first user and the second user, the request including data, the data including at least one of the first identifier or the second identifier, wherein the payment includes an amount of funds, and wherein a first amount of the funds and a second amount of the funds are to be transferred into different accounts; and
in response to receiving the request:
identify, by the payment service and based on a lookup in the datastore using the data, the first user account and the second user account; and
cause, by the payment service and upon receiving a confirmation message via the mobile application, the near-instantaneous transfer of at least the payment of the first amount upon completion of the transaction between the first user and the second user.

8. The system of claim 7, wherein the first user account is created for the first user upon receiving the request.

9. The system of claim 8, wherein the one or more processors are further configured to execute the computer-readable instructions to update the datastore to include the first user account including the first payment data.

10. The system of claim 7, wherein the request is received from a transaction facilitation system associated with a service provider with which the first user is associated.

11. The system of claim 7, wherein the one or more processors are further configured to execute the computer-readable instructions to generate a notification to be transmitted to a mobile device associated with the second user, the notification confirming the payment.

12. The system of claim 7, wherein:
the different accounts comprise a financial account of the first user and an account of a service provider with which the first user is associated;
the first amount is to be transferred to the financial account of the first user; and
the second amount is to be transferred to the account of the service provider with which the first user is associated.

13. The system of claim 12, wherein the financial account of the first user is associated with a financial institution.

14. One or more non-transitory computer-readable media comprising computer-readable instructions, which, when executed by one or more processors of a payment service, cause the payment service to:
receive first payment data and a first identifier associated with a first user, wherein the first payment data is linked to the first identifier and stored (i) in a datastore of the payment service and (ii) in association with a first user account of the payment service;
receive second payment data and a second identifier associated with a second user, wherein the second payment data is linked to the second identifier and stored (i) in the datastore of the payment service and (ii) in association with a second user account of the payment service;
receive, via a mobile application associated with the payment service, a request from the first user for a near-instantaneous transfer of a payment for a transaction between the first user and the second user, the request including data, the data including at least one of the first identifier or the second identifier, wherein the payment includes an amount of funds, and wherein a first amount of the funds and a second amount of the funds are to be transferred into different accounts; and
in response to receiving the request:
identify, based on a lookup in the datastore using the data, the first user account and the second user account; and
cause, upon receiving a confirmation message via the mobile application, the near-instantaneous transfer of at least the payment of the first amount upon completion of the transaction between the first user and the second user.

15. The one or more non-transitory computer-readable media of claim 14, wherein the first user account is created for the first user upon receiving the request.

16. The one or more non-transitory computer-readable media of claim 15, wherein the computer-readable instructions, when executed by the one or more processors, further cause the payment service to update the datastore to include the first user account including the first payment data.

17. The one or more non-transitory computer-readable media of claim 14, wherein the request is received from a transaction facilitation system associated with a service provider with which the first user is associated.

18. The one or more non-transitory computer-readable media of claim 14, wherein:
the different accounts comprise a financial account of the first user and an account of a service provider with which the first user is associated;
the first amount is to be transferred to the financial account of the first user; and
the second amount is to be transferred to the account of the service provider with which the first user is associated.

19. The one or more non-transitory computer-readable media of claim 18, wherein the financial account of the first user is associated with a financial institution.

20. The one or more non-transitory computer-readable media of claim 14, wherein the computer-readable instructions, when executed by the one or more processors, further cause the payment service to generate a notification to be transmitted to a mobile device associated with the second user, the notification confirming the payment.

* * * * *